(12) United States Patent
Sengupta et al.

(10) Patent No.: US 11,494,565 B2
(45) Date of Patent: Nov. 8, 2022

(54) NATURAL LANGUAGE PROCESSING TECHNIQUES USING JOINT SENTIMENT-TOPIC MODELING

(71) Applicant: Optum Technology, Inc., Eden Prairie, MN (US)

(72) Inventors: Ayan Sengupta, Noida (IN); Suman Roy, Bangalore (IN); Tanmoy Chakraborty, New Delhi (IN); Gaurav Ranjan, Bangalore (IN); William Scott Paka, New Delhi (IN)

(73) Assignee: Optum Technology, Inc., Eden Prairie, MN (US)

( * ) Notice: Subject to any disclaimer, the term of this patent is extended or adjusted under 35 U.S.C. 154(b) by 188 days.

(21) Appl. No.: 17/091,244

(22) Filed: Nov. 6, 2020

(65) Prior Publication Data
US 2022/0036010 A1 Feb. 3, 2022

(30) Foreign Application Priority Data
Aug. 3, 2020 (IN) .............................. 202011033181

(51) Int. Cl.
G06F 40/30 (2020.01)
G06N 7/00 (2006.01)
G06N 20/00 (2019.01)

(52) U.S. Cl.
CPC .............. *G06F 40/30* (2020.01); *G06N 7/005* (2013.01); *G06N 20/00* (2019.01)

(58) Field of Classification Search
None
See application file for complete search history.

(56) References Cited

U.S. PATENT DOCUMENTS 7,788,264 B2    8/2010    Zhu et al.
8,356,086 B2    1/2013    Liu et al.
(Continued)

FOREIGN PATENT DOCUMENTS

CN    104199829 A    12/2014
EP    3340069 A1    6/2018

OTHER PUBLICATIONS

Notice of Allowance and Fee(s) Due for U.S. Appl. No. 16/599,588, filed Mar. 25, 2021, (10 pages), United States Patent and Trademark Office, US.
(Continued)

*Primary Examiner* — Nafiz E Hoque
(74) *Attorney, Agent, or Firm* — Alston & Bird LLP

(57) ABSTRACT

There is a need for more effective and efficient natural language processing (NLP) solutions. This need can be addressed by, for example, solutions for performing NLP-based document prioritization by utilizing joint sentiment-topic (JST) modeling. In one example, a method comprises identifying a JST latent distribution of the digital document that describes topic designation probabilities and sentiment designation probabilities for the digital document; determining, by processing the topic designation probabilities, a document-topic entropy measure for the digital document; determining, by processing the sentiment designation probabilities, a sentiment-topic entropy measure for the digital document; determining, by processing per-word inverse domain frequency measures for the digital, a document popularity measure for the digital document; generating the predicted document priority score based on the document-topic entropy measure, the sentiment-topic entropy measure, and the document popularity measure; and performing one or more prediction-based actions based on the predicted document priority score.

20 Claims, 14 Drawing Sheets

(56) References Cited

U.S. PATENT DOCUMENTS

| | | | |
|---|---|---|---|
| 8,515,879 | B2 | 8/2013 | Huh et al. |
| 8,676,730 | B2 | 3/2014 | Ghani et al. |
| 8,682,649 | B2 | 3/2014 | Bellegarda |
| 8,719,302 | B2 | 5/2014 | Bailey et al. |
| 9,116,983 | B2 | 8/2015 | Ameri-Yahia et al. |
| 9,449,080 | B1 | 9/2016 | Zhang |
| 9,501,525 | B2 | 11/2016 | Barker et al. |
| 9,575,952 | B2 | 2/2017 | Kumar Rangarajan Sridhar |
| 9,672,555 | B1 | 6/2017 | Dillard et al. |
| 10,754,883 | B1 | 8/2020 | Kannu et al. |
| 2006/0212288 | A1* | 9/2006 | Sethy ............... G10L 15/18 704/10 |
| 2007/0064626 | A1 | 3/2007 | Evans |
| 2008/0313144 | A1 | 12/2008 | Huston |
| 2009/0319518 | A1 | 12/2009 | Koudas et al. |
| 2010/0023311 | A1 | 1/2010 | Subrahmanian et al. |
| 2010/0153318 | A1* | 6/2010 | Branavan ............ G06F 40/169 706/46 |
| 2012/0239668 | A1 | 9/2012 | Bhattacharyya et al. |
| 2013/0018651 | A1* | 1/2013 | Djordjevic ............. G06Q 10/00 704/9 |
| 2013/0054502 | A1* | 2/2013 | Fano ................. G06N 5/02 706/46 |
| 2014/0280361 | A1 | 9/2014 | Aliferis et al. |
| 2015/0106080 | A1 | 4/2015 | Miura et al. |
| 2015/0254565 | A1 | 9/2015 | Beigman Klebanov et al. |
| 2015/0286710 | A1 | 10/2015 | Chang et al. |
| 2017/0046601 | A1 | 2/2017 | Chang et al. |
| 2017/0068667 | A1 | 3/2017 | Sundaresan et al. |
| 2017/0083817 | A1 | 3/2017 | Di Sciullo et al. |
| 2017/0116204 | A1 | 4/2017 | Davulcu et al. |
| 2017/0124174 | A1 | 5/2017 | Starr et al. |
| 2017/0323065 | A1 | 11/2017 | Proctor et al. |
| 2018/0357302 | A1 | 12/2018 | Qi et al. |
| 2019/0303727 | A1* | 10/2019 | Foroughi ............. G06K 9/6256 |
| 2020/0019611 | A1* | 1/2020 | Tutubalina ............ G06F 40/30 |
| 2021/0027016 | A1* | 1/2021 | Ji ........................ G06F 40/216 |
| 2021/0109994 | A1* | 4/2021 | Sengupta ................ G06N 5/04 |

OTHER PUBLICATIONS

Putri, Indiati Restu et al. "Latent Dirichlet Allocation (LDA) for Sentiment Analysis Toward Tourism Review in Indonesia," International Conference on Computing and Applied Informatics 2016, IOP Conference Series: Journal of Physics: Conference Series, No. vol. 801, No. 1:0102073, Jan. 2017, pp. 1-6. DOI: 10.1088/1742-6596/801/1/012073.

Raja Mohana S.P. et al. "Sentiment Classification Based on Latent Dirichlet Allocation," International Journal of Computer Applications (0975-8887), International Conference on Innovations in Computing Techniques (ICICT 2015), Jan. 2015, pp. 14-16.

NonFinal Office Action for U.S. Appl. No. 16/599,588, filed Oct. 11, 2019 (20 pages), United States Patent and Trademark Office, USA.

"Deeply Moving: Deep Learning for Sentiment Analysis," (6 pages), [article], [online], [Retrieved from the Internet Dec. 18, 2019] <https://nlp.stanford.edu/sentiment/>.

"LDA and Document Similarity," Kaggle, (12 pages). [Online], [Retrieved from the Internet Dec. 1, 2020] <URL: https://www.kaggle.com/ktattan/lda-and-document-similarity>.

"Sentiment Analysis, General Architecture for Text Engineering," (2 pages), [article], [online], [Retrieved from the Internet Dec. 18, 2019] <https://gate.ac.uk/applications/sentiment.html>.

"Sentiment Analysis," OpenText, (6 pages), [article], [online], [Retrieved from the Internet Dec. 18, 2019] <https://www.opentext.com/products-and-solutions/products/discovery/information-access-platform/sentiment-analysis>.

"Tone Analyzer," IBM Watson, (10 pages), [online], [Retrieved from the Internet Dec. 19, 2019] <https://www.ibm.com/watson/services/tone-analyzer/>.

Alshari, Eissa et al. "Improvement of Sentiment Analysis Based on Clustering of Word2Vec Features," In 28th International Workshop on Database and Expert Systems Applications (DEXA), Aug. 29, 2017, pp. 123-126. IEEE.

Arbelaitz, Olatz et al. "An Extensive Comparative Study of Cluster Validity Indices," Pattern Recognition, vol. 46, No. 1, (2013), pp. 243-256.

Bagheri, Ayoub et al. "ADM-LDA: An Aspect Detection Model Based on Topic Modelling Using the Structure of Review Sentences," Journal of Information Science 2014, vol. 40, Issue 5, pp. 621-636.

Blei, David M. et al. "Latent Dirichlet Allocation," Journal of Machine Learning Research, vol. 3, (2003), pp. 993-1022.

Boyd-Graber, Jordan et al. "Holistic Sentiment Analysis Across Languages: Multilingual Supervised Latent Dirichlet Allocation," Proceedings of the 2010 Conference on Empirical Methods in Natural Language Processing, Oct. 9, 2010, pp. 45-55.

Ding, Chris et al. "Orthogonal Non-Negative Matrix Tri-Factorizations for Clustering," In Proceedings of the Twelfth ACM SIGKDD International Conference on Knowledge Discovery and Data Mining, Aug. 20, 2006, pp. 126-135.

Griffiths, Thomas L. et al. "Finding Scientific Topics," Colloquium, Proceedings of the National Academy of Sciences, Apr. 6, 2004, vol. 101, Suppl. 1, pp. 5228-5235.

Hb, Barathi Ganesh et al. "Distributional Semantic Representation in Health Care Text Classification," 2016, (4 pages).

He, Zhaoshui et al. "Symmetric Nonnegative Matrix Factorization: Algorithms and Applications to Probabilistic Clustering." IEEE Transactions on Neural Networks, vol. 22, No. 12, Dec. 2011, pp. 2117-2131.

Hofmann, Thomas. "Probabilistic Latent Semantic Indexing," In SIGIR Forum, (1999), pp. 50-57, ACM.

Hu, Xia et al. "Unsupervised Sentiment Analysis With Emotional Signals," In Proceedings of the 22nd International Conference on World Wide Web May 13, 2013, pp. 607-618. ACM.

Keiningham, Timothy L. et al. "A Longitudinal Examination of Net Promoter and Firm Revenue Growth," Journal of Marketing, vol. 71, No. 3, Jul. 2007, pp. 39-51.

Kim, Soo-Min et al. "Determining The Sentiment of Opinions," In Proceedings of the 20th International Conference on Computational Linguistics Aug. 23, 2004, (7 pages), Association for Computational Linguistics.

Kuang, Da et al. "Nonnegative Matrix Factorization for Interactive Topic Modeling and Document Clustering," Springer International publishing Switzerland 2015, pp. 215-243. DOI: 10.1007/978-3-319-09259-1_7.

Lee, Daniel D. et al. "Algorithms for Non-Negative Matrix Factorization," In Advances in Neural Information Processing Systems 13, pp. 556-562, MIT Press, 2001. T.K. Leen, T.G. Dietterick, and V. Tresp, Editors.

Li, Tao et al. "A Non-Negative Matrix Tri-Factorization Approach to Sentiment Classification With Lexical Prior Knowledge." In Proceedings of the 47th Annual Meeting of the ACL and the 4th International Joint Conference on Natural Language Processing of the AFNLP, pp. 244-252, Aug. 2, 2009, Suntec, Singapore.

Li, Tao et al. "Knowledge Transformation From Word Space to Document Space," In Proceedings of the 31st Annual International ACM SIGIR'08, pp. 187-194, Jul. 20, 2008, Singapore.

Lin, Chenghua et al. "Joint Sentiment Topic Model for Sentiment Analysis," In Proceedings of the 18th ACM Conference on Information and Knowledge Management, CIKM '09, pp. 375-384, Nov. 2, 2009. ACM.

Liu, Bing et al. "Opinion Observer: Analyzing and Comparing Opinions on the Web," In Proceedings of the 14th International Conference on World Wide Web, WWW'05, pp. 342-351, May 10, 2005, Chiba, Japan.

Mehra, Nipun et al. "Sentiment Identification Using Maximum Entropy Analysis of Movie Reviews," Stanford University, (2002), (7 pages).

Mei, Qiaozhu et al. "Automatic Labeling of Multinomial Topic Models," In Proceedings of the 13th ACM SIGKDD International Conference on Knowledge Discovery and Data Mining, pp. 490-499, Aug. 12, 2007, San Jose, California.

(56) References Cited

OTHER PUBLICATIONS

Mei, Qiaozhu et al. "Topic Sentiment Mixture: Modeling Facets and Opinions in Weblogs," In Proceedings of the 16th International Conference on World Wide Web, WWW'07, pp. 171-180, May 8, 2007, Banff, Alberta, Canada.

Mikolov, Tomas et al. "Efficient Estimation of Word Representations in Vector Space," pp. 1-12, arXiv: 1301.3781 v3 [cs.CL], Sep. 7, 2013.

O'Hare, Neil et al. "Topic-Dependent Sentiment Analysis of Financial Blogs," In Proceedings of the 1st International CIKM Workshop on Topic-Sentiment Analysis for Mass Opinion Measurement, Nov. 6, 2009, pp. 9-16, Hong Kong, China. ACM.

Pang, Bo et al. "Opinion Mining and Sentiment Analysis," Foundations and Trends in Information Retrieval, vol. 2, No. 1-2, pp. 1-135, (2008).

Pang, Bo et al. "Thumbs Up? Sentiment Classification Using Machine Learning Techniques," In Proceedings of the 2002 Conference on Empirical Methods in Natural Language Processing (EMNLP), arXiv:cs/0205070v1 [cs.CL], May 28, 2002.

Poddar, Lahari et al. "Author-Aware Aspect Topic Sentiment Model to Retrieve Supporting Opinions From Reviews," In Proceedings of the 2017 Conference on Empirical Methods in Natural Language Processing, EMNLP'17, pp. 472-481, Sep. 7 , 2017, Copenhagen, Denmark.

Rahman, Md Mustafizur et al. "Hidden Topic Sentiment Model," In Proceedings of the 25th International Conference on World Wide Web, WWW '16, pp. 155-165, Apr. 11, 2016, Montreal, Quebec, Canada.

Titov, Ivan et al. "A Joint Model of Text and Aspect Ratings for Sentiment Summarization," In Proceedings of ACL-08: HLT, pp. 308-316, Jun. 2008, Association for Computational Linguistics.

Turney, Peter D. "Thumbs Up or Thumbs Down? Semantic Orientation Applied to Unsupervised Classification of Reviews," In Proceedings of the 40th Annual Meeting of the Association for Computational Linguistics (ACL)'04, pp. 417-424, Jul. 6, 2002.

University of Massachusetts, "Topic Model Diagnostics," MAchine Learning for LanguagE Toolkit (MALLET), (7 pages). [Article, Online]. [Retrieved from the Internet Dec. 1, 2020] <URL: http://mallet.cs.umass.edu/diagnostics.php>.

Waggoner, Alexander A. "Triple Non-Negative Matrix Factorization Technique for Sentiment Analysis and Topic Modeling," (2017), CMC Senior Theses.1550, Claremont McKenna College, (25 pages). [Retrieved from the Internet Dec. 18, 2019] <https://scholarship.claremont.edu/cmc theses/1550/>.

Xu et al. ,"Document Clustering Based on Non-Negative Matrix Factorization," In Proceedings of the 26th Annual International ACM SIGIR Conference on Research and Development in Information Retrieval, SIGIR '03, pp. 267-273, Jul. 28, 2003. ACM.

Yan, Xiaohui et al. "Learning Topics in Short Texts by Non-Negative Matrix Factorization on Term Correlation Matrix," In Proceedings of the 13th SIAM International Conference on Data Mining, May 2, 2013, pp. 749-757, Society for Industrial and Applied Mathematics.

Yang, Alex et al. "Inferring Business Similarity From Topic Modeling [Latent Dirichlet Allocation and Jaccard Similarity Applied to Yelp Reviews]," (2015), (7 pages). [Retrieved from the Internet Dec. 1, 2020] <URL: http://cseweb.ucsd.edu/classes/sp15/cse190-c/reports/sp15/004.pdf>.

Zhao, Jun et al. "Adding Redundant Features for CRFs-Based Sentence Sentiment Classification," In Proceedings of the 2008 Conference on Empirical Methods in Natural Language Processing, EMNLP '08, pp. 117-126, Oct. 2008, Association for Computational Linguistics, Honolulu, Hawaii.

\* cited by examiner

| Document Name | Priority Score |
|---|---|
| Complaint_001 | 7.1 |
| Complaint_002 | 7.3 |
| Complaint_003 | 6.3 |
| Complaint_004 | 3.4 |
| Complaint_005 | 5.3 |
| Complaint_006 | 1.2 |
| Complaint_007 | 0.3 |
| Complaint_008 | 7.9 |
| Complaint_009 | 8.1 |
| Complaint_010 | 9.1 |
| Complaint_011 | 7.2 |
| Complaint_012 | 7.4 |
| Complaint_013 | 5.3 |
| Complaint_014 | 6.6 |

FIG. 6

| Topic | Sentiment +ve | Sentiment -ve |
|---|---|---|
| 1 | 0.7 | 0.3 |
| 2 | 0.8 | 0.2 |
| 3 | 0.2 | 0.8 |

"Obama was all over the news because of the inspiring speech he gave yesterday"

FIG. 12

NATURAL LANGUAGE PROCESSING TECHNIQUES USING JOINT SENTIMENT-TOPIC MODELING

CROSS-REFERENCES TO RELATED APPLICATION(S)

The present application claims priority to the Indian Provisional Patent Application No. 202011033181 (filed on Aug. 3, 2020), which is incorporated by reference herein in its entirety.

BACKGROUND

Various embodiments of the present invention address technical challenges related to performing natural language processing (NLP). Existing NLP systems are ill-suited to efficiently and reliably perform joint sentiment-topic (JST) modeling. Various embodiments of the present address the shortcomings of the noted NLP systems and disclose various techniques for efficiently and reliably performing JST modeling in NLP systems.

BRIEF SUMMARY

In general, embodiments of the present invention provide methods, apparatus, systems, computing devices, computing entities, and/or the like for performing JST modeling. Certain embodiments utilize systems, methods, and computer program products that perform predictive document prioritization using JST. Certain embodiments utilize systems, methods, and computer program products that perform JST using one or more of per-document topic distributions, per-document topic-sentiment distributions, and cross-document per-word topic-sentiment distributions.

In accordance with one aspect, a method is provided. In one embodiment, the method comprises: identifying a joint sentiment-topic (JST) latent distribution of the digital document, wherein the JST latent distribution describes one or more topic designation probabilities for the digital document and one or more sentiment designation probabilities for the digital document; determining, by processing the one or more topic designation probabilities using a document-topic entropy determination machine learning model, a document-topic entropy measure for the digital document; determining, by processing the one or more sentiment designation probabilities using a document-topic entropy determination machine learning model, a sentiment-topic entropy measure for the digital document; determining, by processing one or more per-word inverse domain frequency measures for the digital document using a document popularity determination machine learning model, a document popularity measure for the digital document; generating the predicted document priority score based at least in part on the document-topic entropy measure, the sentiment-topic entropy measure, and the document popularity measure; and performing one or more prediction-based actions based at least in part on the predicted document priority score.

In accordance with another aspect, a computer program product is provided. The computer program product may comprise at least one computer-readable storage medium having computer-readable program code portions stored therein, the computer-readable program code portions comprising executable portions configured to: identify a joint sentiment-topic (JST) latent distribution of the digital document, wherein the JST latent distribution describes one or more topic designation probabilities for the digital document and one or more sentiment designation probabilities for the digital document; determine, by processing the one or more topic designation probabilities using a document-topic entropy determination machine learning model, a document-topic entropy measure for the digital document; determine, by processing the one or more sentiment designation probabilities using a document-topic entropy determination machine learning model, a sentiment-topic entropy measure for the digital document; determine, by processing one or more per-word inverse domain frequency measures for the digital document using a document popularity determination machine learning model, a document popularity measure for the digital document; generate the predicted document priority score based at least in part on the document-topic entropy measure, the sentiment-topic entropy measure, and the document popularity measure; and perform one or more prediction-based actions based at least in part on the predicted document priority score.

In accordance with yet another aspect, an apparatus comprising at least one processor and at least one memory including computer program code is provided. In one embodiment, the at least one memory and the computer program code may be configured to, with the processor, cause the apparatus to: identify a joint sentiment-topic (JST) latent distribution of the digital document, wherein the JST latent distribution describes one or more topic designation probabilities for the digital document and one or more sentiment designation probabilities for the digital document; determine, by processing the one or more topic designation probabilities using a document-topic entropy determination machine learning model, a document-topic entropy measure for the digital document; determine, by processing the one or more sentiment designation probabilities using a document-topic entropy determination machine learning model, a sentiment-topic entropy measure for the digital document; determine, by processing one or more per-word inverse domain frequency measures for the digital document using a document popularity determination machine learning model, a document popularity measure for the digital document; generate the predicted document priority score based at least in part on the document-topic entropy measure, the sentiment-topic entropy measure, and the document popularity measure; and perform one or more prediction-based actions based at least in part on the predicted document priority score.

BRIEF DESCRIPTION OF THE DRAWINGS

Figure 1:
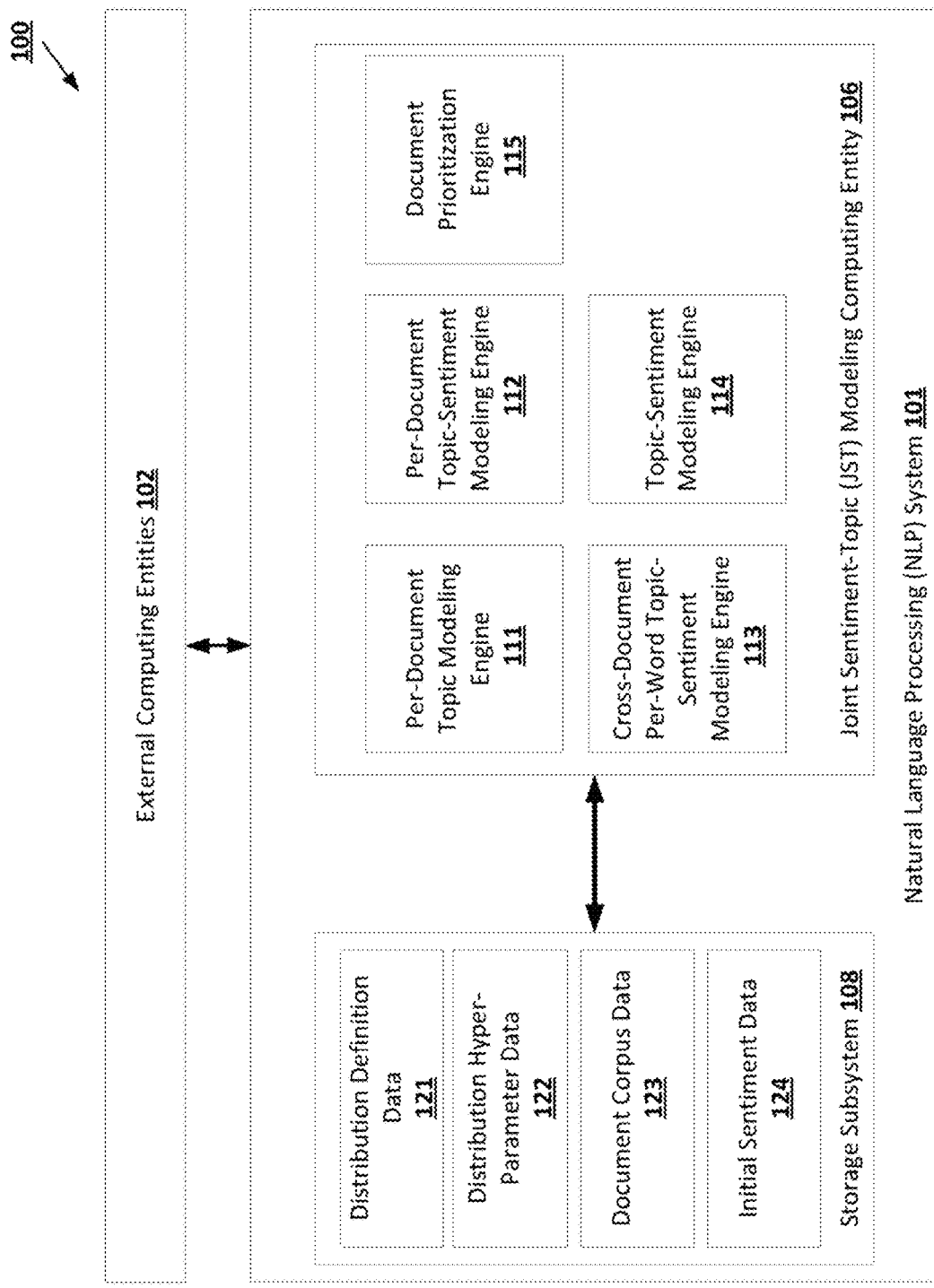

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
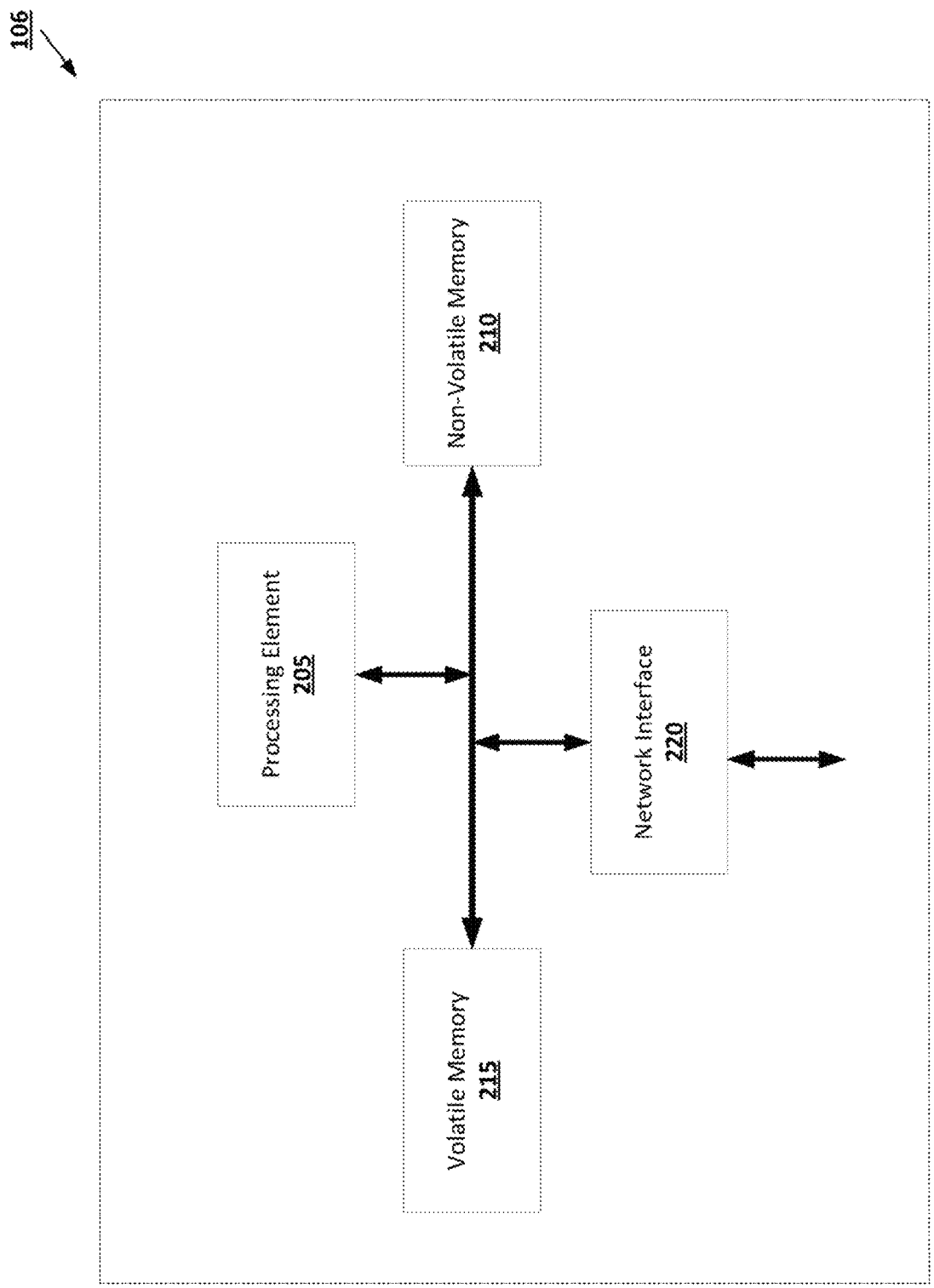

FIG. 2 provides an example JST modeling computing entity in accordance with some embodiments discussed herein.

Figure 3:
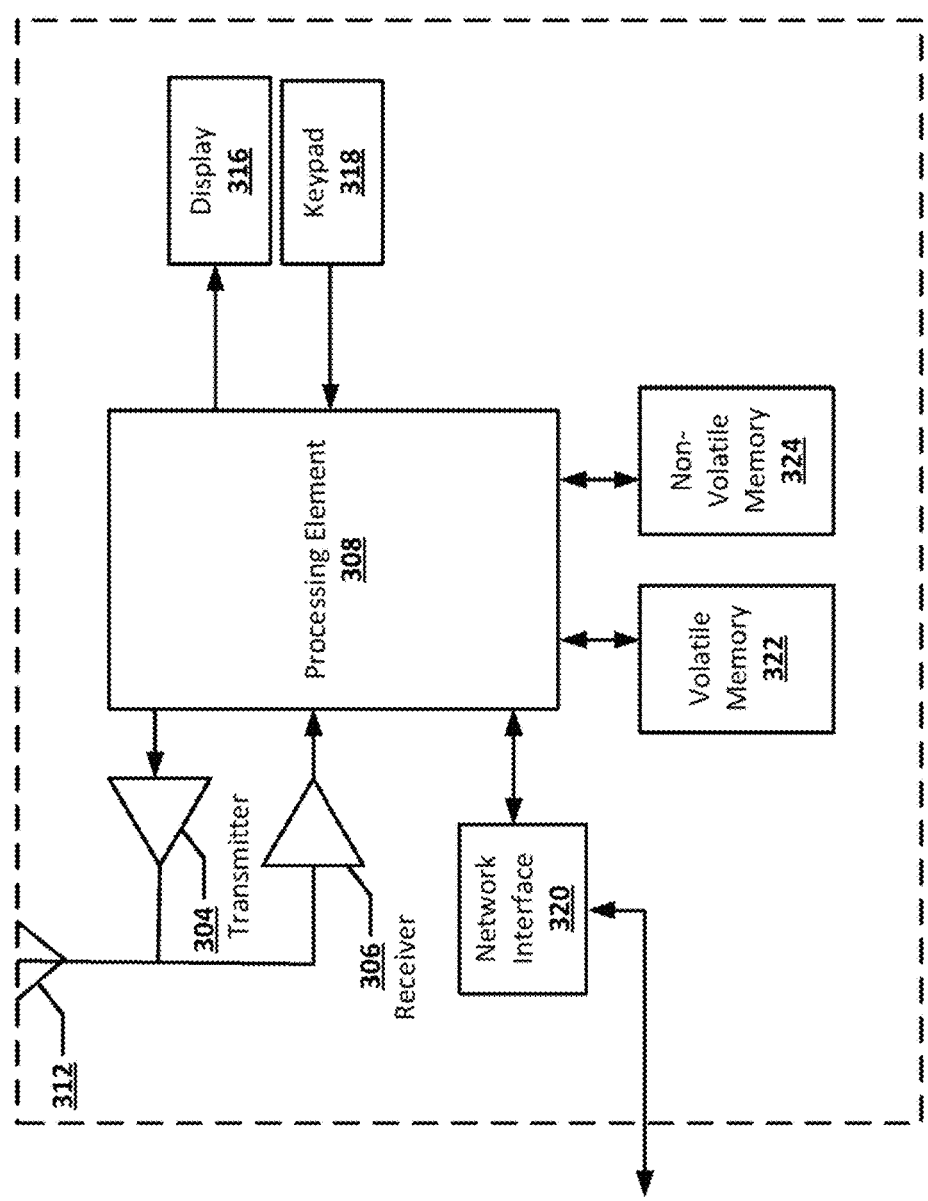

FIG. 3 provides an example external computing entity in accordance with some embodiments discussed herein.

Figure 4:
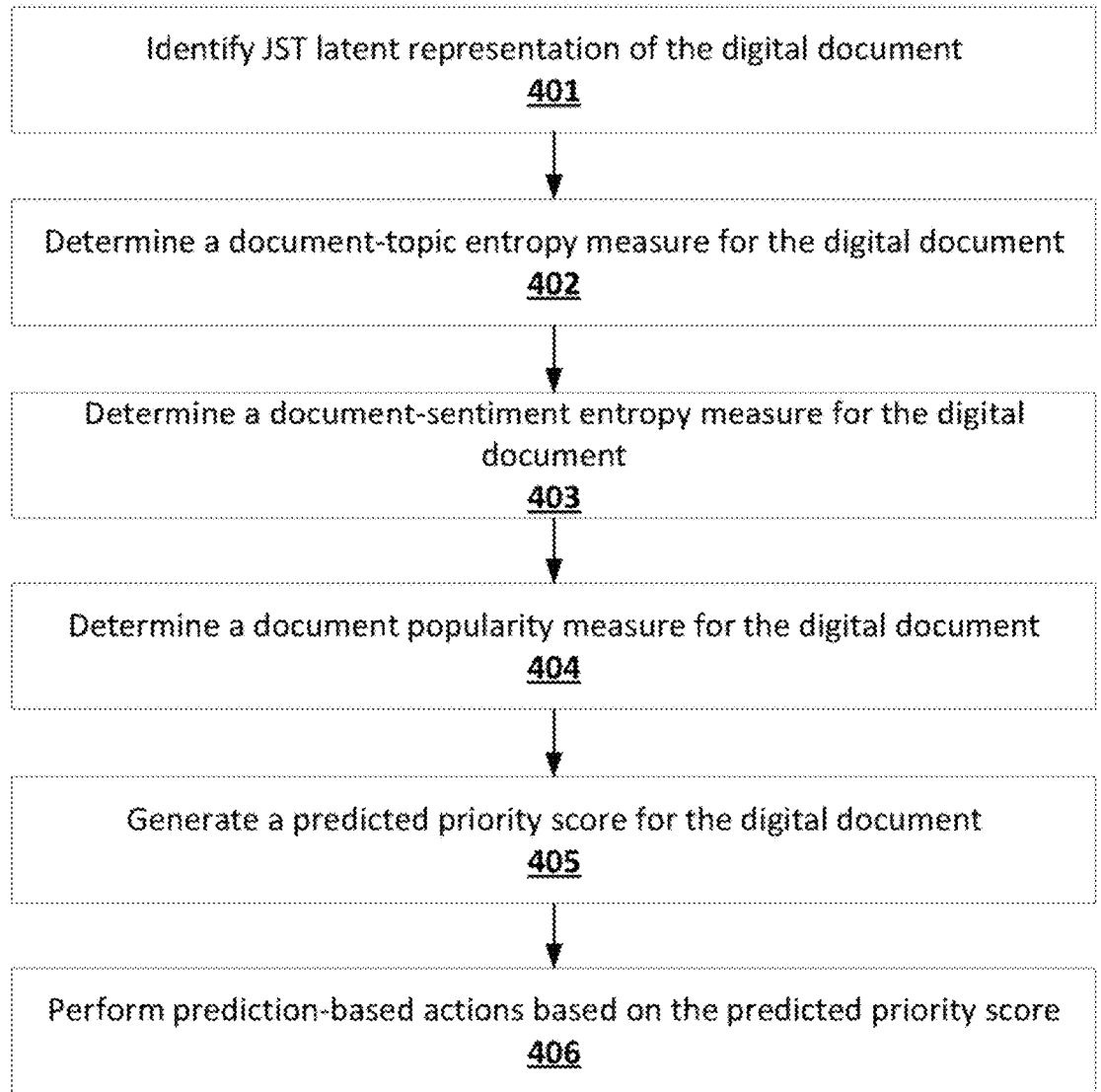

FIG. 4 is a data flow diagram of an example process for generating a predicted priority score for a digital document in accordance with some embodiments discussed herein.

Figure 5:
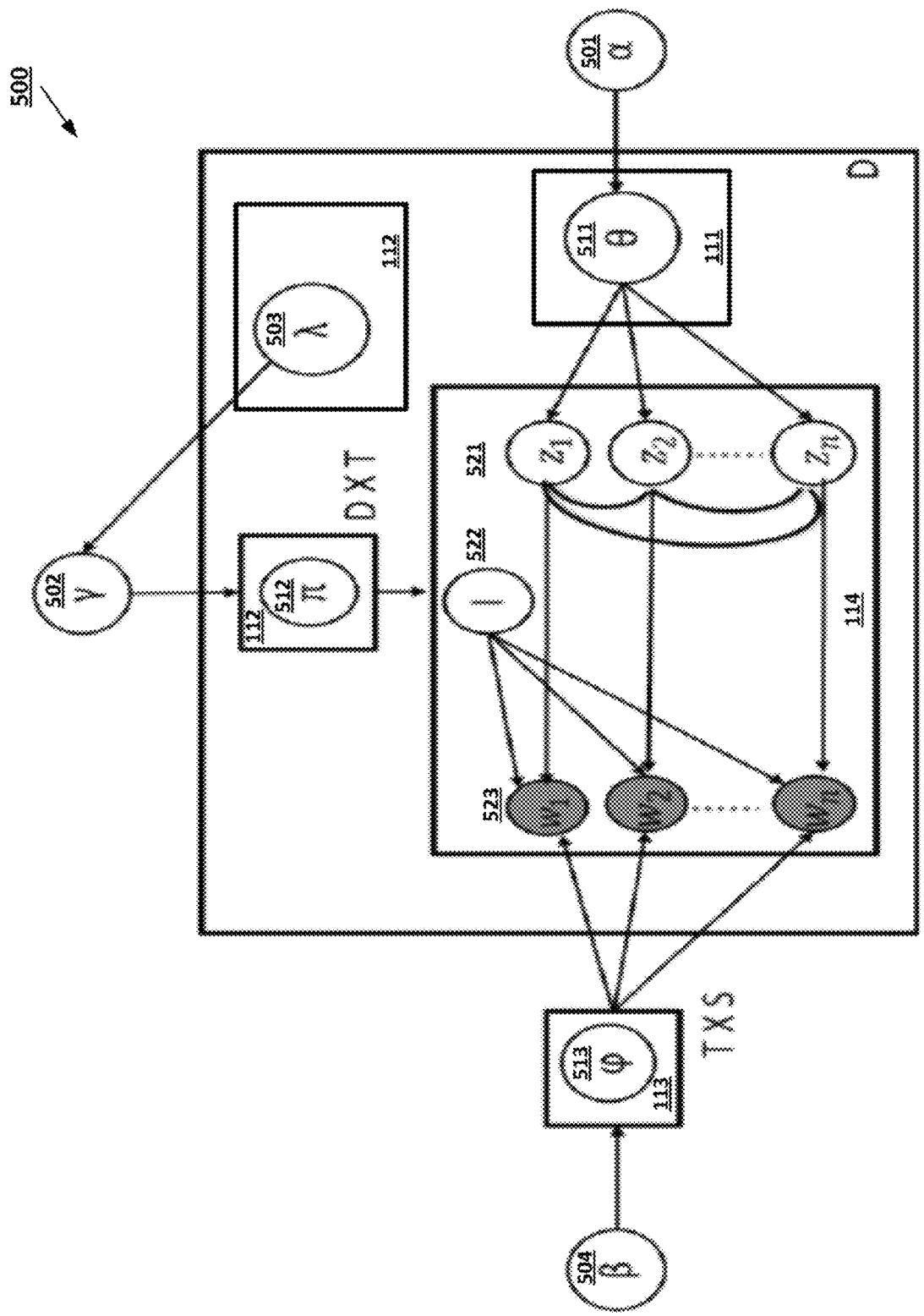

FIG. 5 provides an operational example of an embedding-enhanced labeled joint topic-sentiment machine learning model in accordance with some embodiments discussed herein.

FIG. 6 provides an operational example of a prediction output user interface in accordance with some embodiments discussed herein.

Figure 7:
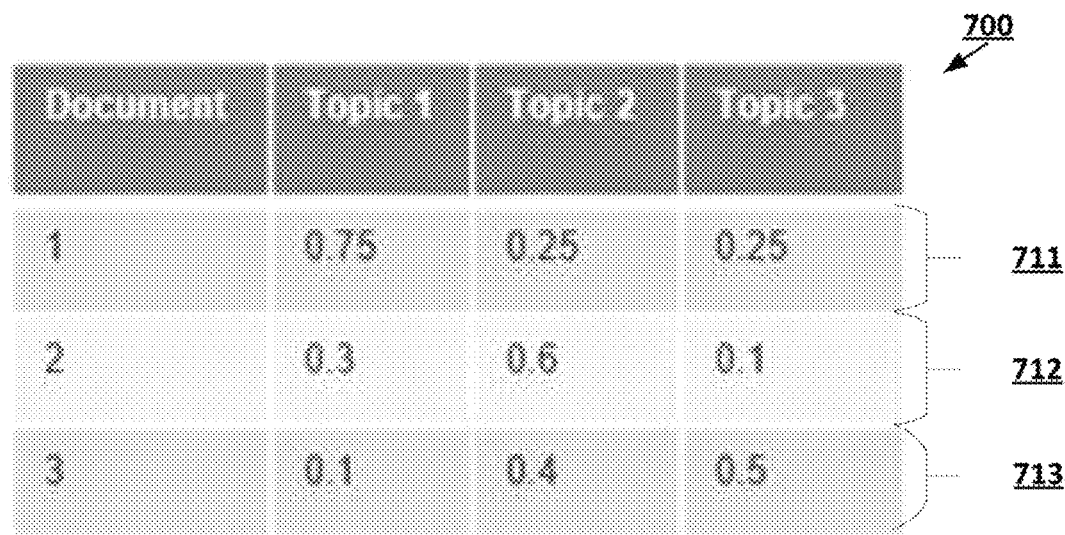

FIG. 7 provides an operational example of a per-document topic distribution data object in accordance with some embodiments discussed herein.

Figure 8:
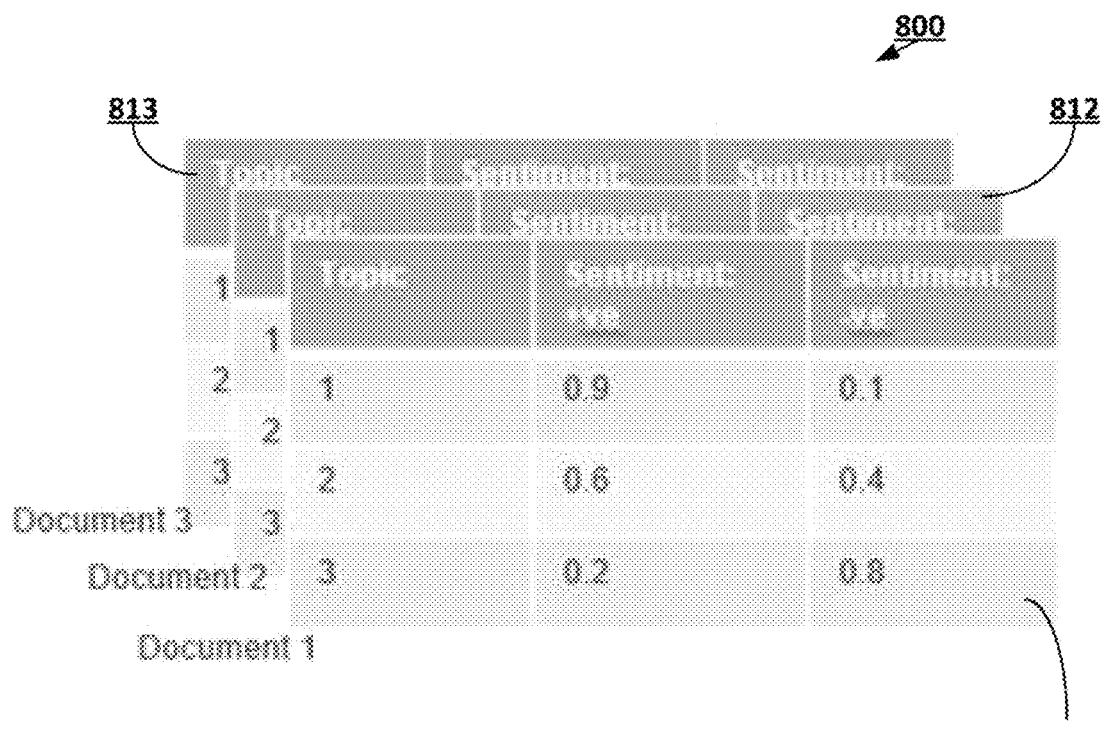

FIG. 8 provides an operational example of a per-document topic-sentiment distribution data object in accordance with some embodiments discussed herein.

Figure 9:
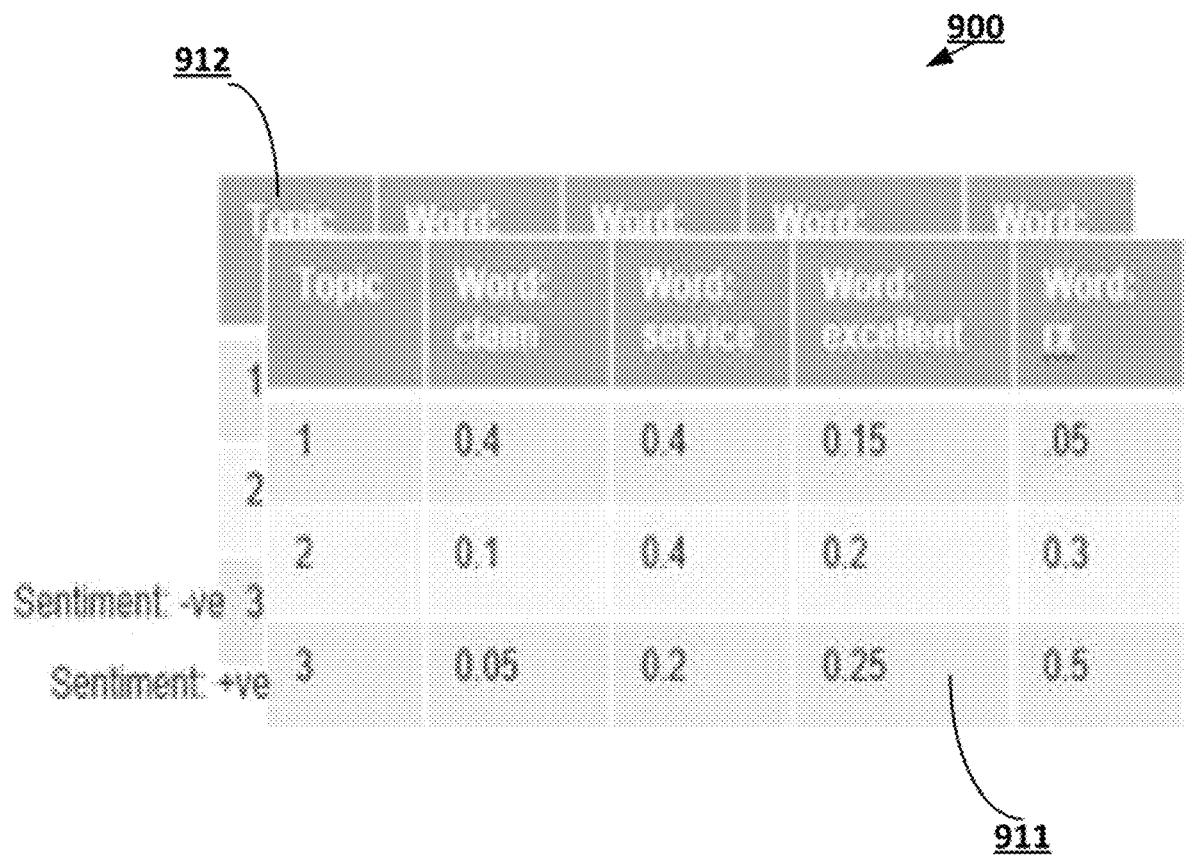

FIG. 9 provides an operational example of cross-document per-word topic-sentiment distribution data in accordance with some embodiments discussed herein.

Figure 10A:
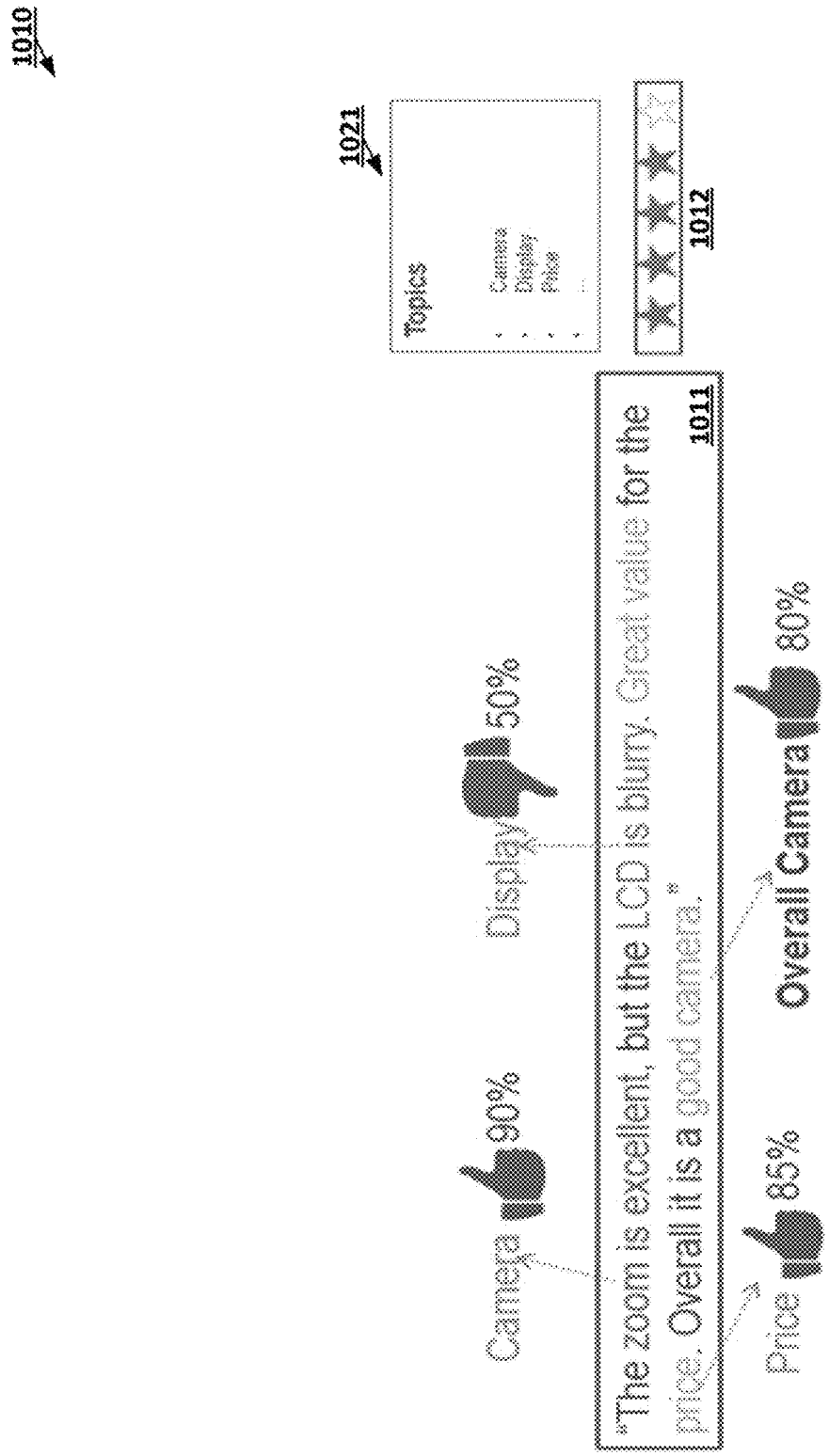
Figure 10B:
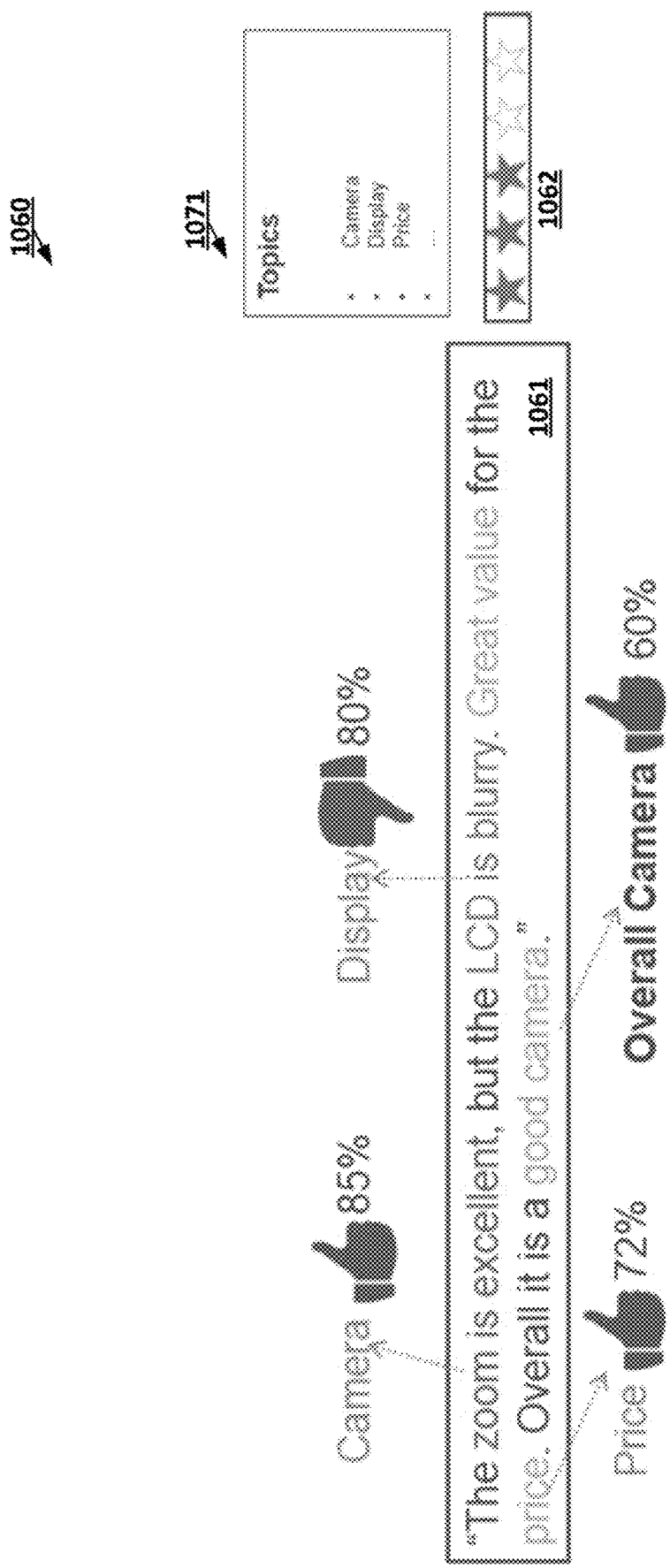

FIGS. 10A-10B provide operational examples of JST modeling output interfaces in accordance with some embodiments discussed herein.

FIG. 11 provides an operational example of a cross-document per-word topic-sentiment distribution data object in accordance with some embodiments discussed herein.

FIG. 12 provides an operational example of a digital document in accordance with some embodiments discussed herein.

Figure 13:
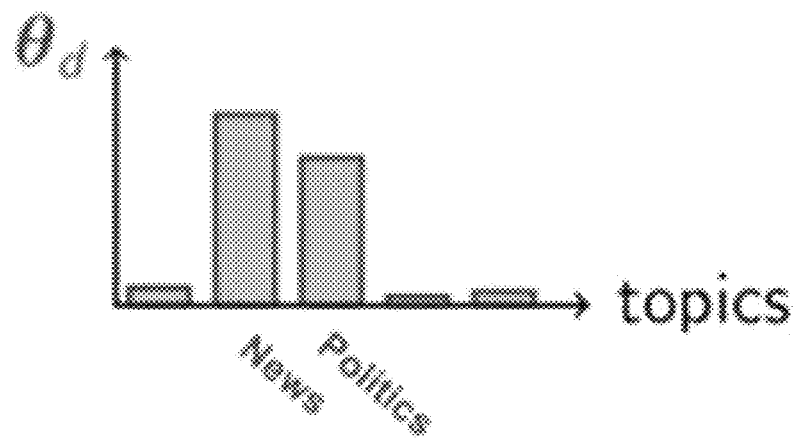

FIG. 13 provides an operational example of a topic-sentiment correlation graph in accordance with some embodiments discussed herein.

Figure 14:
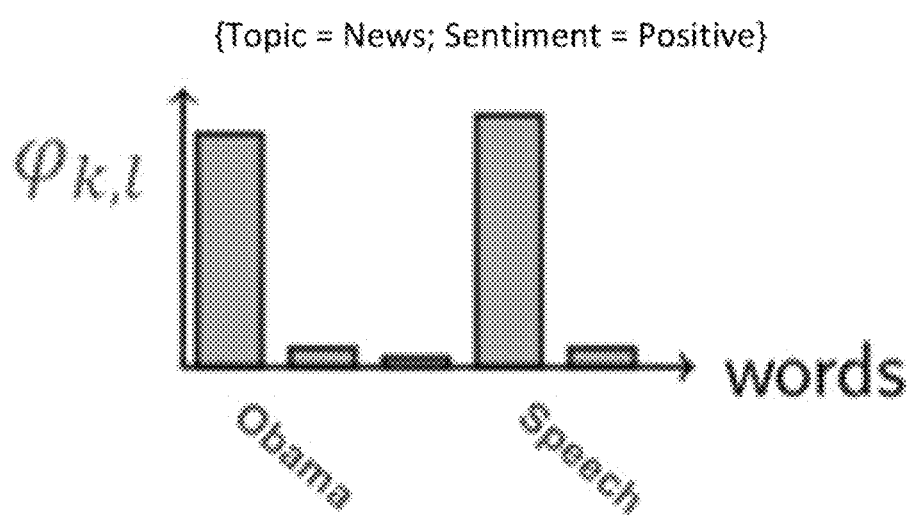

FIG. 14 provides an operational example of a topic word-sentiment correlation graph in accordance with some embodiments discussed herein.

Figure 15:
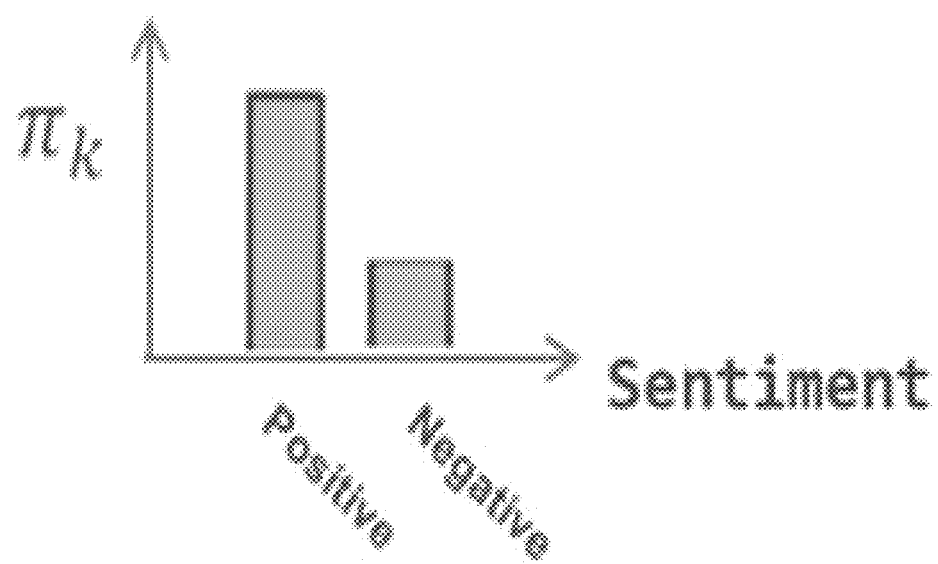

FIG. 15 provides an operational example of a topic-sentiment correlation graph in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Discussed herein methods, apparatus, systems, computing devices, computing entities, and/or the like for NLP analysis using JST modeling and/or predictive document prioritization. As will be recognized, however, the disclosed concepts can be used to perform any type of NLP analysis, including topic detection, sentiment detection, machine translation, lexical analysis, semantic analysis, grammar analysis, tone analysis, and/or the like.

Various embodiments of the present invention disclose techniques for performing JST on data using external (e.g., contextual) information that can be used to train JST models using fewer training iterations and fewer amounts of training data. For example, various embodiments of the present invention disclose integrating predictive insights generated by external information (e.g., user-provided ratings) in adjusting a sentiment distribution hyper-parameter that can be used to generate topic-sentiment distributions. By using the noted technique and related techniques for integrating predictive insights provided by external information to train JST models, various embodiments of the present invention improve computational efficiency of performing training of JST models by training such models using fewer training iterations and fewer amounts of training data. In doing so, various embodiments of the present invention make important technical contributions to improving computational efficiency of performing NLP operations.

Various embodiments of the present invention improve computational efficiency of performing document prioritization by disclosing solutions for utilizing JST latent representations of digital documents produced by JST procedures in performing document prioritization. As discussed above, various embodiments of the present invention improve computational efficiency of performing training of JST models by training such models using fewer training iterations and fewer amounts of training data. Other embodiments of the present invention utilize the JST latent representations of digital documents produced by JST procedures in performing document prioritization. For example, various embodiments of the present invention disclose performing document prioritization based on document-topic entropy measures that are generated based on topic designation probabilities for digital documents and document-sentiment entropy measures that are generated based on sentiment designation probabilities for digital documents, where the topic designation probabilities and sentiment designation probabilities are determined based on JST latent representations determined as an output of a JST procedure. In doing so, various embodiments of the present invention improve the computational efficiency of performing document prioritization by replacing the feature extraction stage of performing document prioritization with the results of a computationally efficient JST procedure. This is another way in which various embodiments of the present invention make important technical contributions to improving computational efficiency of performing NLP operations.

An important application of various embodiments of the present invention relates to performing JST and/or performing JST-based document prioritization on short text digital documents, as further described below. Short text is a popular mean of communication in online social media and e-commerce websites that appear abundant in different applications. Mining short texts is thus essential to extract thematic content of the text as well as to identify the sentiment expressed by the customers about certain entities (products, services, movies, and/or the like). In many applications it may be required to discover both topic and sentiment simultaneously as seen in target dependent or topic-specific sentiment analysis. There have been few attempts to predict both sentiment and topics simultaneously. Some of the existing solutions use skipgram-based JST model to discover topics as well as sentiment values of the topics without considering any external sentiment labels (e.g., star ratings). However, JST suffers from many drawbacks. For example, JST mostly deals with only unlabeled data; thus it is unable to incorporate external labels such as the ratings given by the customers, ground-truth labels obtained from the annotators, etc. Inventors have shown that that external labels often play an important role in determining the sentiment and topics jointly. For instance, a 4-star rating given by the customer can be incorporated to better identify the sentiment of the topics. Also JST does not allow context-based information to be used for model discovery, which otherwise may lead to better topic quality as we will see later in this paper.

To alleviate these issues, various embodiments of the present invention introduce a Embedding Enhanced Labeled Joint Sentiment Topic (ELJST) machine learning model, a novel framework that jointly discovers topics and sentiment for short texts in presence of labeled (with discrete values) texts. In some embodiments, the ELJST model uses a Markov Random Field (MRF) regularization model that creates an undirected graph for each text by constructing edges between contextually and semantically similar words, and formulates a well-defined potential function to enhance topic identification. ELJST performs better than JST in terms of the quality of extracted topics and associated sentiment assignments.

JST modeling is an important problem in NLP analysis as it combines benefits of topic modeling and sentiment modeling. For example, one area in which JST modeling is beneficial relates to automatic feedback data analysis. When analyzing feedback data (e.g., customer feedback data), an NLP analysis module will benefit from determining not just which topics feedback data refers to and what sentiments the feedback data entails, but also how the topic model of the feedback data and the sentiment model of the feedback data relate to each other. For example, when analyzing a feedback data document indicating that "The price of the camera is high but the quality is good; overall I am satisfied," a NLP analysis module would benefit from inferring not just that the feedback document relates to cameras, price of cameras, and quality of cameras and that the feedback document has a particular overall sentiment, but also that the feedback data document has a positive sentiment with respect to the camera topic designation, a negative sentiment with respect to the camera price topic designation, and a positive sentiment with respect to the camera price topic designation.

As illustrated by the above-noted example, when an NLP analysis module is capable of performing effective JST modeling, it is better configured to understand complexities of NLP input documents and utilize such inferred complexities in facilitating various NLP-related applications. For example, a JST-enabled NLP analysis module is capable of performing effective predictive inferences based at least in part on NLP feedback data. Moreover, a JST-enabled NLP analysis module is capable of performing various operational adjustments and/or generating various operational recommendations for organizational predictive entities in accordance with predictive inferences that are performed based at least in part on the underlying NLP feedback data. For instance, a JST-enabled NLP analysis module may be able to process patient feedback data to perform operational adjustments and/or generate operational recommendations for one or more healthcare delivery organizational predictive entities, health insurance provider organizational predictive entities, human resource organizational predictive entities, and/or the like.

Despite the importance of the JST modeling problem to effective and reliable NLP analysis, various existing NLP analysis solutions fail to enable such JST modeling at all. Moreover, even when NLP analysis solutions facilitate some form of JST modeling, such JST modeling solutions suffer from many drawbacks. For example, many existing JST modeling solutions fail to enable topic detection, sentiment detection, and/or JST detection with respect to both individual documents in a document corpus and the document corpus as a whole. In other words, many existing JST modeling solutions fail to enable both local and global topic detection, sentiment detection, and/or JST detection with respect to a multi-document document corpus. This failure is significant as it undermines the ability of existing JST modeling solutions to utilize both document-specific predictive signals and cross-document predictive signals in performing topic detection, sentiment detection, and/or JST detection with respect to a multi-document document corpus. Thus, the failure of many existing JST modeling solutions in enabling both local and global predictive inference undermines the effectiveness of such JST modeling solutions.

As another example of the failures of various existing JST modeling solutions, many existing JST modeling solutions fail to enable sentiment analysis configured to generate each of binary sentiment designations, multi-class sentiment designations, and real-value sentiment designations. A binary sentiment designation for an NLP data item may categorize a sentimental aspect of the NLP data item as one of two candidate sentiment designations (e.g., a positive candidate sentiment designation and a negative candidate sentiment designation). A multi-class sentiment designation for an NLP data item may categorize a sentimental aspect of the NLP item as one of three or more candidate sentiment designations (e.g., a positive candidate sentiment designation, a negative candidate sentiment designation, and a neutral candidate sentiment designation). A real value sentiment designation appearing in a finite interval for an NLP data item may categorize a sentimental aspect of the NLP item as one of point in a bucket among a finite number of buckets denoting an interval (sub-interval of the original interval) of continuous real-valued sentiment designation. Many existing JST modeling solutions use predictive models that fail to enable generation of all the noted three types of sentiment designations. For example, many feedforward-neural-network-based JST modeling solutions fail to enable generation of binary sentiment designations, multi-class sentiment designations, and real-value sentiment designations. Instead, many feedforward-neural-network-based JST modeling solutions are limited to the sentiment designation type defined for them during training.

As a further example, many existing JST modeling solutions are not configured to generate JST detections for documents that lack any prior sentiment labeling information and/or require extensive external lexicon information to perform effective and reliable JST modeling. Either of the two noted shortcomings limit the effectiveness of existing JST modeling solutions for performing JST modeling in NLP domains for which extensive prior sentiment label data and/or extensive lexicon definition information is not available. Thus, because of their failure to generate JST detections for documents that lack any prior sentiment labeling information and/or require extensive external lexicon information, many existing JST modeling solutions face substantial technical challenges, especially as it relates to performing JST modeling in NLP domains for which extensive prior sentiment label data and/or extensive lexicon definition information is not available.

Various embodiments of the present invention address shortcomings of NLP solutions that fail to enable effective and reliable JST modeling. For example, as further described below, various embodiments of the present invention disclose NLP solutions that perform JST modeling using one or more of per-document topic distributions, per-document topic-sentiment distributions, and cross-document per-word topic-sentiment distributions. By providing effective and reliable solutions for JST modeling, various embodiments of the present invention address technical shortcomings of NLP systems that fail to properly model interactions between inferred topic models of documents and inferred sentiment models of documents. By modeling interactions between inferred topic models of documents and inferred sentiment models of documents, various embodiments of the present invention make technical contributions to effectiveness and reliability of NLP in domains in which interactions between inferred topic models of documents and inferred sentiment models of documents provide important predictive signals for NLP. As discussed above, examples of such domains include NLP domains that relate to feedback processing for improving operational processes. Accordingly, various embodiments of the present invention make important technical contributions to improving feedback processing and to improving operational processes in various organizational predictive entities such as hospitals.

Various embodiments of the present invention address technical challenges of JST solutions that fail to generate per-document and cross-document JST detections. For example, to perform per-document JST modeling, various embodiments of the present invention disclose inferring per-document topic distributions for particular documents and per-document topic-sentiment distributions for particular documents. Moreover, to perform cross-document JST modeling, various embodiments of the present invention disclose inferring cross-document per-word topic-sentiment distributions for particular vocabulary collections and sampling from such cross-document per-word topic-sentiment distributions to generate cross-document word associations. By disclosing performing all of per-document topic distributions, per-document topic-sentiment distributions, and cross-document per-word topic-sentiment distributions, various embodiments of the present invention disclose generating local JST detections (e.g., per-document JST detections) and global JST detections (e.g., cross-document JST detections, such as per-document-corpus JST detections). In doing so, various embodiments of the present invention address technical shortcomings of JST solutions that fail to generate per-document and cross-document JST detections.

Various embodiments of the present invention address technical shortcomings of JST modeling solutions that fail to generate all of binary sentiment designations, multi-class designations, and the like. In doing so, various embodiments of the present invention address technical shortcomings of JST modeling solutions that fail to generate all of binary sentiment designations, multi-class designations, and the like.

Various embodiments of the present invention enable JST modeling for both sentiment-labeled documents and non-sentiment-labeled documents as well as without any domain lexicon information. For example, various embodiments of the present invention utilize any prior sentiment information to optionally adjust a cross-document sentiment distribution hyper-parameter that can in turn be used to define a per-document topic-sentiment distribution. By utilizing prior sentiment information as an optional adjustment parameter rather than a required parameter, various embodiments of the present invention enable JST modeling for both sentiment-labeled documents and non-sentiment-labeled documents. Moreover, various embodiments of the present invention enable performing JST modeling without any lexicon information, e.g., without utilizing any information about semantic meanings of particular linguistic constructs. Accordingly, various embodiments of the present invention enable JST modeling for both sentiment-labeled documents and non-sentiment-labeled documents as well as without any domain lexicon information. In doing so, various embodiments of the present invention address technical shortcomings of existing JST modeling solutions that fail to enable one or both of JST modeling for both sentiment-labeled documents and non-sentiment-labeled documents and JST modeling without any domain lexicon information.

II. DEFINITIONS

The term "joint sentiment-topic (JST) latent distribution" may describe a data entity that is configured to describe at least one feature related to topic associations and sentiment associations of a corresponding digital document. For example, the JST latent distribution for a corresponding digital document may describe at least one of one or more selected topics for the digital document, one or more selected sentiment designations for each selected topic of the one or more selected topics, and one or more word associations from the words used in the digital document for each topic-sentiment pair. As another example, the JST latent distribution for a corresponding digital document may describe at least one of a per-document topic distribution for the digital document, a per-document topic-sentiment distribution for the digital document, and a cross-document per-word topic sentiment distribution for the digital document.

The term "topic designation probability" may describe a data entity that is configured to describe a predicted level of association between a corresponding topic designation and a corresponding digital document. In some embodiments, a digital document may be associated with T topic designation probabilities, where T describes a count of a set of candidate topic designations, and where each topic designation probability of the T topic designation probabilities describes a predicted level of association between a corresponding topic designation of the T candidate topic designations and the noted digital document. In some embodiments, the topic designation probabilities associated with a digital document are determined based on a per-document topic distribution for the digital document, where the per-document topic distribution for the digital document is in turn determined via processing the digital document using a trained JST machine learning model, such as a trained embedding-enhanced labeled JST (ELJST) machine learning model. In some embodiments, a document prioritization engine may determine the topic designation probabilities for a digital document by identifying a JST latent representation of the digital document which describes a per-document topic distribution and then subsequently determine the topic designation probabilities for the digital document based on the per-document topic distribution for the digital document as described by the JST latent representation of the digital document.

The term "sentiment designation probability" may describe a data entity that is configured to describe a predicted level of association between a corresponding sentiment designation and a corresponding digital document. In some embodiments, a digital document may be associated with S sentiment designation probabilities, where S describes a count of a set of candidate sentiment designations, and where each sentiment designation probability of the T sentiment designation probabilities describes a predicted level of association between a corresponding sentiment designation of the S candidate sentiment designations and the noted digital document. In some embodiments, the sentiment designation probabilities associated with a digital document are determined based on a per-document topic-sentiment distribution for the digital document, where the per-document topic-sentiment distribution for the digital document is determined via processing the digital document using a trained JST machine learning model, such as a trained ELJST machine learning model. In some embodiments, a document prioritization engine may determine the sentiment designation probabilities for a digital document by identifying a JST latent representation of the digital document which describes a per-document topic-sentiment distribution and then subsequently determine the sentiment designation probabilities for the digital document based on the per-document topic-sentiment distribution for the digital document as described by the JST latent representation of the digital document.

The term "JST machine learning model" may describe a data entity that is configured to describe parameters, hyper-parameters, and/or defined operations/layers of a machine learning model that is configured to generate features about a topic-sentiment distribution of a digital document. In some embodiments, a JST machine learning model may be configured to determine at least one of a topic distribution for an input digital document as well as a sentiment distribution for each selected topic. For example, an exemplary JST machine learning model may be configured to determine that an input digital document is associated with a topic related to customer service quality and has a positive sentiment with respect to the noted topic. In some embodiments, a JST machine learning model may be configured to determine at least one of a topic distribution for an input digital document, a sentiment distribution for each selected topic, and a word distribution for each topic-sentiment pair. For example, an exemplary JST machine learning model may be configured to determine that an input digital document is associated with a topic related to customer service quality, has a positive sentiment with respect to the noted topic, and that the conclusion related to the positive sentiment of the input digital document with respect to the topic related to customer service quality is supported by the words "great customer interaction" and "very helpful to customers".

The term "embedding-enabled labeled JST (ELJST) machine learning model" may be a JST machine learning model that is configured to process words as word embeddings using a word embedding model that enables inferring semantic similarity across words and placing semantically similar words under common topic-sentiment labels. For example, an exemplary ELJST machine learning model may be configured to process word embeddings using a Markov Random Field (MRF) regularized model that creates an undirected graph for each input digital document by constructing edges between contextually and semantically similar words, which enables formulating a well-defined potential function to enhance topic identification. In some embodiments, the ELJST machine learning model utilizes a prior topic label and/or a prior sentiment label of a digital document, such as an NPS-based sentiment score of a digital document and/or a user-provided rating for a feedback digital document.

The term "document-topic entropy measure" may describe a data entity that is configured to describe a measure of topical association diversity of the corresponding digital document. For example, when a first digital document is predicted to be strongly associated with one topic designation while a second digital document is predicted to be strongly associated with two topic designations, the second document may have a higher document-topic entropy measure. In some embodiments, given a set of T candidate topic designations each having a topic designation probability with respect to a particular digital document, the document-topic entropy measure for the particular digital document may be determined based on each of the T topic designation probabilities associated with the particular digital document.

The term "document-topic entropy machine learning model" may describe a data entity that is configured to describe parameters, hyper-parameters, and/or defined operations/layers of a machine learning model that is configured to process at least a portion of the topic designation probabilities for an input digital document in order to generate a document-topic entropy measure for the digital document. For example, given a set of T candidate topic designations each having a topic designation probability with respect to a particular digital document, the document-topic entropy machine learning model may be configured to process the T topic designation probabilities associated with the particular digital document to generate the document-topic entropy measure for the particular digital document. In some embodiments, to generate the document-topic entropy measure for an input digital document, the document-topic entropy machine learning model may be configured to perform at least some of the operations of the equation $H(d) = \tau_{k=1}^{T} p_k^{(d)} \log(p_k^{(d)})$, where $H(d)$ is the document-topic entropy measure of the input digital document d, k is an index variable that iterates over T candidate topic designations, and $p_k^{(d)}$ is the topic designation probability of assigning $k^{th}$ topic designation to the input digital document d.

The term "document-sentiment entropy" measure may describe a data entity that is configured to describe a measure of sentiment association diversity of a corresponding digital document. For example, when a first digital document is predicted to be strongly associated with one sentiment designation while a second digital document is predicted to be strongly associated with two sentiment designations, the second document may have a higher document-sentiment entropy measure. In some embodiments, given a set of S candidate sentiment designations each having a sentiment designation probability with respect to a particular digital document, the document-sentiment entropy measure for the particular digital document may be determined based on each of the S sentiment designation probabilities associated with the particular digital document.

The "document-sentiment entropy machine learning model" may describe a data entity that is configured to describe parameters, hyper-parameters, and/or defined operations/layers of a machine learning model that is configured to process at least a portion of the sentiment designation probabilities for an input digital document in order to generate a document-sentiment entropy measure for the digital document. For example, given a set of S candidate sentiment designations each having a sentiment designation probability with respect to a particular digital document, the document-topic entropy machine learning model may be configured to process the S sentiment designation probabilities associated with the particular digital document to generate the document-sentiment entropy measure for the particular digital document. In some embodiments, to generate the document-sentiment entropy measure for an input digital document, the document-sentiment entropy machine learning model may be configured to perform at least some of the operations of the equation $I(d) = \Sigma_{k=1}^{S} p_k^{(d)} \log(p_k^{(d)})$, where $I(d)$ is the document-sentiment entropy measure of the input digital document d, k is an index variable that iterates over S candidate sentiment designations, and $p_k^{(d)}$ is the sentiment designation probability of assigning $k^{th}$ sentiment designation to the input digital document d.

The term "document popularity measure" may describe a data entity that is configured to describe a measure of word usage uniqueness of an input digital document across an input document corpus that includes the input digital document. For example, given an input document corpus that includes a first digital document and a second digital document, and further given that the first digital document consists of words that are common across the input document corpus while the second digital document consists of words that are uncommon across the input document corpus, the first digital document corpus will likely have a higher document popularity measure relative to the second digital document. In some embodiments, the document popularity measure for a particular digital document is determined based on the per-word inverse domain frequency measures for at least some of the words used in the digital document. The per-word inverse domain frequency may describe the frequency of usage of a corresponding word within an input document corpus that includes a set of digital documents. For example, the per-word inverse domain frequency for a corresponding word may describe an Inverse Domain Frequency (IDF) score for the corresponding word, where the IDF score is determined in accordance with the Term Frequency-Inverse Domain Frequency (TF-IDF) algorithm.

The term "document popularity determination machine learning model" may describe a data entity that is configured to describe parameters, hyper-parameters, and/or defined operations/layers of a machine learning model that is configured to generate the document popularity measure for an input digital document based on one or more per-word inverse domain frequency measures for the digital document. In some embodiments, to determine the document popularity measure for a particular digital document, the document popularity determination machine learning model may process the per-word inverse domain frequency measures for at least some of the words used in the digital document. In some embodiments, to determine the document popularity measure for a particular digital document, the document popularity determination machine learning model performs at least some of the operations of the equation $$P(d) = \sqrt[N_d]{\prod_{i=1}^{N_d} w_{(d,i)}},$$

where P(d) is the document popularity measure for the particular digital document d, i is an index variable that iterates over $N_d$ selected words of the particular digital document d (e.g., over all of the words of the particular digital document d, over non-stop words of the particular digital document d, and/or the like), and $w_{(d,i)}$ is the per-word inverse domain frequency measures of word i in the particular digital document d.

The term "document priority score" may describe a data entity that is configured to describe a likelihood that a corresponding digital document includes important content relative to other digital documents. For example, in some embodiments, when a digital document has a lower document-topic entropy measure, it is deemed to have strong associations with a fewer number of topics and thus the digital document is deemed to have a lower predicted priority score. As another example, in some embodiments, when a digital document has a lower document-sentiment entropy measure, it is deemed to have strong associations with a fewer number of sentiments and thus the digital document is deemed to have a lower predicted priority score. As yet another example, in some embodiments, when a digital document has a lower document priority measure, it is deemed to have more unique words and thus the digital document is deemed to have a lower predicted priority score. In some embodiments, the predicted priority score for a digital document is determined based on an aggregation model that is configured to process the document-topic entropy measure for the digital document, the sentiment-topic entropy measure for the digital document, and the document popularity measure for the digital document to generate the predicted priority score for the digital document, where the aggregation model is configured to define a negative relationship between the predicted priority score for the digital document and at least one of the document-topic entropy measure for the digital document, the sentiment-topic entropy measure for the digital document, and the document popularity measure for the digital document. In some embodiments, the predicted priority score for a digital document is determined based on an aggregation model that is configured to process the document-topic entropy measure for the digital document, the sentiment-topic entropy measure for the digital document, and the document popularity measure for the digital document to generate the predicted priority score for the digital document, where the aggregation model is configured to define a negative relationship between the predicted priority score for the digital document and each of the document-topic entropy measure for the digital document, the sentiment-topic entropy measure for the digital document, and the document popularity measure for the digital document.

The term "topic distribution hyper-parameter ($\alpha$)" may describe a data entity that is configured to describe a data value associated with an input document corpus and a range of candidate topic designations, where the data value indicates the likelihood that each digital document in the input document corpus may be associated with all candidate topic designations in the range of candidate topic designations. In some embodiments, the topic distribution hyper-parameter ($\alpha$) for an input document corpus and a range of candidate topic designations may indicate a measure of statistical distribution (e.g., an average and/or median) of multi-topic-inclusivity of the digital documents in the input document corpus in relation to the range of candidate topic designations. For example, if each digital document in an input document corpus may be associated with at least one candidate topic designation selected from a range of three candidate topic designations T1, T2, and T3, the topic distribution hyper-parameter ($\alpha$) may indicate a likelihood that each digital document in the input document corpus will be associated with each of the three candidate topic designations T1, T2, and T3. In the noted example, a high value of the topic distribution hyper-parameter ($\alpha$) for the noted input document corpus may indicate a high likelihood that each digital document in the input document corpus is associated with each candidate topic designations of the three candidate topic designations T1, T2, and T3, while a low value of the topic distribution hyper-parameter ($\alpha$) for the noted input document corpus may indicate a low likelihood that each digital document in the input document corpus is associated with each candidate topic designations of the three candidate topic designations T1, T2, and T3.

The term "sentiment distribution hyper-parameter ($\gamma$)" may describe a data entity that is configured to describe a data value associated with an input document corpus, a range of candidate topic designations, and a range of candidate sentiment designations, where the data value is configured to indicate a likelihood that each digital document in the input document corpus includes a threshold per-document topic-sentiment correlation value for each topic-sentiment pair of a candidate topic designation from the range of candidate topic designations and a candidate sentiment designation from the range of candidate sentiment designations. For example, if each digital document in an input document corpus may be associated with at least one candidate topic designation selected from a range of three candidate topic designations T1, T2, and T3 as well as at least one candidate sentiment designation selected from a range of three candidate sentiment designations S1, S2, and S3, the sentiment distribution hyper-parameter ($\gamma$) for the input document corpus may indicate the likelihood that each document in the input document corpus will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the sentiment distribution hyper-parameter ($\gamma$) for the noted input document corpus may indicate a high likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of the sentiment distribution hyper-parameter ($\gamma$) for the noted input document corpus may indicate a low likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3).

The term "per-document initial sentiment hyper-parameter ($\lambda$)" may describe a data entity that is configured to describe at least one aspect of initial sentiment information associated with the digital document. As indicated above, the NLP inputs provided to the NLP system 101 by the external computing entities 102 may include initial sentiment information associated with at least one digital document in an input document corpus. Such initial sentiment information, which may be stored as part of the initial sentiment data in a storage subsystem of an NLP system and retrieved therefrom, can be used to in part define a per-document topic-sentiment distributions ($\pi$) for those digital documents that have corresponding initial sentiment information. In some embodiments, to generate the per-document topic-sentiment correlation indicators for a particular document having particular initial sentiment information, the per-document topic-sentiment modeling engine may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter ($\gamma$) for the input document corpus that includes the particular digital document and a per-document initial sentiment hyper-parameter ($\lambda^d$) for the particular digital document.

The term "topic-sentiment distribution hyper-parameter ($\beta$)" may describe a data entity that is configured to describe a data value associated with a vocabulary collection, a range of candidate topic designations, and a range of candidate sentiment designations, where the data value is configured to indicate a likelihood that each word in the vocabulary collection has a threshold correlation with each topic-sentiment pair of a candidate topic designation from the range of candidate topic designations and a candidate sentiment designation from the range of candidate sentiment designations. For example, if each word in a vocabulary collection may be associated with at least one candidate topic designation selected from a range of three candidate topic designations T1, T2, and T3 as well as at least one candidate sentiment designation selected from a range of three candidate sentiment designations S1, S2, and S3, the topic-sentiment distribution hyper-parameter ($\beta$) for the vocabulary collection may indicate the likelihood that each word in the vocabulary collection will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the topic-sentiment distribution hyper-parameter ($\beta$) for the vocabulary collection may indicate a high likelihood that each word in the vocabulary collection is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of topic-sentiment distribution hyper-parameter ($\beta$) for the vocabulary collection may indicate a low likelihood that each word in the vocabulary collection corpus is associated with all of the sentiment-topic pairs (T1, S1), (T1, S2), (T1, S3), (T2, S1), (T2, S2), (T2, S3), (T3, S1), (T3, S2), and (T3, S3).

The term "per-document topic distribution" may be a data entity that describes a distribution, where the distribution in turn describes a per-document correlation indicator for each document-topic pair of a digital document in an input document corpus and a candidate topic designation from a range of candidate topic designations. For example, given an input document corpus that includes four digital documents D1, D2, D3, and D4, and further given a range of two candidate topic designations T1 and T2, the per-document topic distribution ($\theta$) for the input corpus may indicate that document D1 is 30% associated with T1 and 70% associated with T2; document D2 is 60% associated with T1 and 40% associated with T2; document D3 is 80% associated with T1 and 20% associated with T2; and document D4 is 50% associated with T1 and 50% associated with T2. In the described example, the values 0.30, 0.70, 0.60, 0.40, 0.80, 0.20, 0.50, and 0.50 may be referred to as per-document topic correlation indicators for document-topic pairs (D1, T1), (D1, T2), (D2, T1), (D2, T2), (D3, T1), and (D4, T2) respectively. In some embodiments, to generate the per-document topic distribution ($\theta$), a per-document topic modeling engine may utilize a topic distribution hyper-parameter ($\alpha$), which may be stored as part of the distribution hyper-parameter data on a storage subsystem of an NLP system. In some embodiments, a per-document topic modeling engine generates the per-document topic distribution ($\theta$) for an input document corpus and a range of candidate topic designations based at least in part on a distribution over the topic distribution hyper-parameter ($\alpha$) for the input document corpus and the range of candidate topic designations (e.g., a Dirichlet distribution over the topic distribution hyper-parameter ($\alpha$) for the input document corpus and the range of candidate topic designations).

The term "per-document topic-sentiment distribution ($\pi$)" may refer to a data entity that is configured to describe a distribution for an input document corpus, a range of candidate topic designations, and a range of candidate sentiment designations, where the distribution in turn describes, for each digital document in the input document corpus, a corresponding per-document topic-sentiment correlation indicator for each topic-sentiment pair of a candidate topic designation from the range of candidate topic designations and candidate sentiment designation from the range of candidate sentiment designations. For example, given an input document corpus that includes two digital documents D1 and D2, the range of candidate topic designations T1 and T2, and the range of candidate sentiment destinations S1 and S2, the corresponding per-document topic-sentiment distribution ($\pi$) may indicate that: (i) to the extent document D1 relates to topic T1, document D1 has a 90% ratio of sentiment S1 and a 10% ratio of sentiment S2; (ii) to the extent document D1 relates to topic T2, document D1 has a 30% ratio of sentiment S1 and a 70% ratio of sentiment S2; (iii) to the extent document D2 relates to topic T1, document D2 has a 40% ratio of sentiment S1 and a 60% ratio of sentiment S2; and (iv) to the extent document D2 relates to topic T2, document D1 has a 50% ratio of sentiment S1 and a 50% ratio of sentiment S2. In the mentioned examples, digital document D1 may be associated with per-document sentiment correlation indicators 0.90 and 0.10 for topic-sentiment pairs (T1, S1) and (T1, S2) respectively and per-document sentiment correlation indicators 0.30 and 0.70 for topic-sentiment pairs (T2, S1) and (T2, S2) respectively. Moreover, in the mentioned examples, digital document D2 may be associated with per-document sentiment correlation indicators 0.40 and 0.60 for topic-sentiment pairs (T1, S1) and (T1, S2) respectively and per-document sentiment correlation indicators 0.50 and 0.50 for topic-sentiment pairs (T2, S1) and (T2, S2) respectively. In some embodiments, to generate the per-document topic-sentiment distribution ($\pi$) for a particular digital document in an input document corpus, a per-document topic-sentiment modeling engine may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter ($\gamma$) for the input document corpus and a per-document initial sentiment hyper-parameter ($\lambda^d$) for the particular digital document. For example, the per-document topic-sentiment modeling engine may first generate a per-document sentiment distribution hyper-parameter ($\gamma^d$) for a particular digital document in an input document corpus based at least in part on the cross-document sentiment distribution hyper-parameter ($\gamma$) for the input document corpus and (if such information is available for the particular digital document) the per-document initial sentiment hyper-parameter ($\lambda^d$) for the particular digital document. Afterward, the per-document topic-sentiment modeling engine may generate the per-document topic-sentiment distribution ($\pi$) for the particular digital document as a distribution over the per-document sentiment distribution hyper-parameter ($\gamma^d$) for the particular digital document (e.g., a Dirichlet distribution over the per-document sentiment distribution hyper-parameter ($\gamma^d$) for the particular digital document).

The term "cross-document per-word topic-sentiment distribution ($\varphi$)" may refer to a data entity that is configured to describe a distribution for an input vocabulary collection, a range of candidate topic designations, and a range of candidate sentiment designations, where the distribution in turn describes, for, each word in the vocabulary collection, a corresponding per-word topic-sentiment correlation indicator for each topic-sentiment pair of a candidate topic designation from the range of candidate topic designations and candidate sentiment designation from the range of candidate sentiment designations. For example, given a vocabulary collection that includes words W1, W2, and W3, the range of candidate topic designations T1 and T2, and the range of candidate sentiment destinations S1 and S2, the corresponding cross-document per-word topic-sentiment distribution ($\varphi$) may indicate that: (i) when word W1 occurs in relation to topic T1, word W1 has a 70% ratio of sentiment S1 and a 30% ratio of sentiment S2; (ii) when word W1 occurs in relation to topic T2, word W1 has a 80% ratio of sentiment S1 and a 20% ratio of sentiment S2; (iii) when word W2 occurs in relation to topic T1, word W2 has a 60% ratio of sentiment S1 and a 40% ratio of sentiment S2; (iv) when word W2 occurs in relation to topic T2, document D1 has a 80% ratio of sentiment S1 and a 20% ratio of sentiment S2; (v) when word W3 occurs in relation to topic T1, word W3 has a 40% ratio of sentiment S1 and a 60% ratio of sentiment S2; (vi) when word W3 occurs in relation to topic T2, document D1 has a 70% ratio of sentiment S1 and a 30% ratio of sentiment S2. In the above-mentioned example, word W1 is associated with the following cross-document per-word topic-sentiment correlation indicators: 0.70 for topic-sentiment pair (T1, S1), 0.30 for topic-sentiment pair (T1, S2), 0.80 for topic-sentiment pair (T2, S1), and 0.20 for topic-sentiment pair (T2, S2). Furthermore, in the above-mentioned example, word W2 is associated with the following cross-document per-word topic-sentiment correlation indicators: 0.60 for topic-sentiment pair (T1, S1), 0.40 for topic-sentiment pair (T1, S2), 0.80 for topic-sentiment pair (T2, S1), and 0.20 for topic-sentiment pair (T2, S2). Moreover, in the above-mentioned example, word W3 is associated with the following cross-document per-word topic-sentiment correlation indicators: 0.40 for topic-sentiment pair (T1, S1), 0.60 for topic-sentiment pair (T1, S2), 0.70 for topic-sentiment pair (T2, S1), and 0.40 for topic-sentiment pair (T2, S2). In some embodiments, to generate a cross-document per-word topic-sentiment distribution ($\varphi$), a cross-document per-word topic-sentiment modeling engine may utilize a topic-sentiment distribution hyper-parameter ($\beta$). For example, the cross-document per-word topic-sentiment modeling engine may generate the cross-document per-word topic-sentiment distribution ($\varphi$) for a vocabulary collection, a range of candidate topic designations, and a range of candidate sentiment designations as a distribution over the topic-sentiment distribution hyper-parameter ($\beta$) for the vocabulary collection, the range of candidate topic designations, and the range of candidate sentiment designations (e.g., a Dirichlet distribution over the topic-sentiment distribution hyper-parameter ($\beta$) for the vocabulary collection, the range of candidate topic designations, and the range of candidate sentiment designations).

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing JST modeling operations. The architecture 100 includes an NLP system 101 as well as one or more external computing entities 102. The external computing entities 102 may be configured to provide NLP inputs to the NLP system 101. In response, the NLP system 101 may be configured to perform one or more NLP operations, such as one or more NLP operations that require at least one JST modeling operation, on the received NLP inputs in order to generate NLP outputs and provide the generated NLP outputs to the external computing entities 102.

In some embodiments, the NLP system 101 and the external computing entities 102 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

In some embodiments, the NLP inputs provided to the NLP system 101 by the external computing entities 102 include data associated with a document corpus. A document corpus may include one or more digital documents. A digital document may be a collection of one or more NLP data values, such as one or more alphanumeric characters associated with an unstructured text document. Examples of digital documents include a feedback data object that includes text data for feedback from a user entity (e.g., a patient user entity, a medical provider user entity, and/or the like). Such feedback data objects may be generated using at least one of one or more End-of-Service (ETS) surveys, one or more Interactive Voice Response (IVR) surveys, one or more email-based surveys, and one or more touch-point surveys. Other examples of digital documents included in the NLP inputs may include medical note digital documents, medical protocol digital documents, and/or the like.

In some embodiments, the NLP inputs provided to the NLP system 101 by the external computing entities 102 include data associated with a document corpus, as well as initial sentiment information for at least one of the digital documents in the document corpus. For example, the initial sentiment information for a digital document may include a sentiment value and/or a sentiment label for the digital document that is generated using a naïve NLP process. As another example, the initial sentiment information for a digital document may be a rating of the digital document by an author user entity associated with the digital document and/or by a reviewer user entity associated with the digital document. As yet another example, when a digital document relates to a particular real-world event, the initial sentiment information for the digital document may be generated based at least in part on an overall rating of the particular real-world event (e.g., a patient rating of a medical procedure and/or an auditor rating of a medical procedure). As a further example, when a digital document relates to real-world customer experience event, the initial sentiment information for the digital document may be generated based at least in part on a Net Promoter Score (NPS) measure for the real-world customer experience event.

The NLP system 101 is configured to process the NLP inputs received from the external computing entities 102 to generate corresponding NLP outputs. Examples of NLP outputs are provided below. However, one of ordinary skill in the art will recognize that the provided examples are not meant to be exhaustive and that the NLP outputs generated by the NLP system 101 to provide to the external computing entities 102 may include other data objects generated based at least in part on the NLP inputs which are not listed below.

In some embodiments, when the NLP inputs provided to the NLP system 101 by the external computing entities 102 include one or more digital documents, the NLP outputs generated by the NLP system 101 and provided by the NLP system 101 to the external computing entities 102 may include at least one of the following: (i) one or more per-document topic designations for each of the one or more digital documents; (ii) one or more per-document sentiment designations for each of the one or more digital documents; (iii) one or more per-document topic-specific sentiment designations for each of the one or more digital documents; (iv) one or more per-word topic designations for at least some of the words in the one or more digital documents; (v) one or more per-word sentiment designations for each of at least some of the words in the one or more digital documents; and (vi) one or more per-word topic-specific sentiment designations for each of the one or more digital documents.

In some embodiments, when the NLP inputs provided to the NLP system 101 by the external computing entities 102 include one or more digital documents characterized by a range of one or more candidate sentiment labels, the NLP outputs generated by the NLP system 101 and provided by the NLP system 101 to the external computing entities 102 may include at least one of the following: (i) one or more cross-document per-word topic-sentiment correlation indicators for the one or more digital documents; (ii) one or more per-document topic correlation indicators for each of the one or more digital documents; (iii) one or more per-document topic-sentiment correlation indicators for each of the one or more digital documents; and (iv) one or more per-sentiment-label topic-word correlation indicators for each of the one or more candidate sentiment labels in the range of one or more candidate sentiment labels associated with the one or more digital documents.

In some embodiments, when the NLP inputs provided to the NLP system 101 by the external computing entities 102 include one or more feedback digital documents related to operations of an organizational predictive entity (e.g., a healthcare delivery predictive entity), the NLP outputs generated by the NLP system 101 and provided to the external computing entities 102 may include operational recommendations for the organizational predictive entity and/or automatic operational adjustments to the operations of the organizational predictive entity. Examples of such operational NLP outputs include critical event identification policies, critical event prioritization policies, NPS improvement policies, customer targeting policies, growth attainment policies, operational management policies, and/or the like.

The NLP system 101 may include a storage subsystem 108 and a JST modeling computing entity 106. The JST modeling computing entity 106 may be configured to perform the one or more JST modeling operations on the NLP inputs provided by the one or more external computing entities 102. To perform the JST modeling operations, the JST modeling computing entity 106 may generate and utilize one or more NLP distributions. To generate each NLP distribution, the JST modeling computing entity 106 may utilize one or more hyper-parameters associated with the NLP distribution.

The storage subsystem 108 may be configured to store data associated with the NLP distributions by the JST modeling computing entity 106, such as distribution definition data 121 associated with the NLP distributions and distribution hyper-parameter data 122 associated with the NLP distributions. The storage subsystem 108 may further be configured to store data associated with the NLP inputs (e.g., document corpus data 123 associated with one or more NLP inputs provided by the external computing entities 102 and/or initial sentiment data 124 associated with document corpuses in one or more NLP inputs provided by the external computing entities). The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The NLP distributions generated and utilized by the JST modeling computing entity 106 may each be characterized by an inferred distribution between two or more of digital documents in an input document corpus, words (e.g., n-grams, such as unigrams or bigrams) in the digital documents, candidate topic designations (e.g., from a discrete or continuous range of candidate topic designations) for the input document corpus, and candidate sentiment designations (e.g., from a discrete or continuous range of candidate sentiment designations) for the input document corpus. The inferred distributions characterizing the NLP distributions may in turn be generated as distributions over hyper-parameters associated with the NLP distributions. In some embodiments, at least a part of the data describing distributions characterizing the NLP distributions and/or at least a part of the data describing hyper-parameters of the NLP distributions are stored in the storage subsystem 108, as part of the distribution definition data 121 of the storage subsystem 108 and the distribution hyper-parameter data 122 of the storage subsystem respectively. Example NLP distributions are described below. However, one of ordinary skill in the art will recognize that the JST modeling computing entity 106 may generate and utilize other NLP distributions between two or more of digital documents, words, candidate topic designations, and candidate sentiment designations.

As discussed above, to generate the NLP distributions, the JST modeling computing entity 106 may utilize one or more distribution hyper-parameters for the NLP distributions, such as one or more distribution hyper-parameters stored as part of the distribution hyper-parameter data 122 on the storage subsystem 108. The hyper-parameters of an NLP distribution (a.k.a. the "prior parameters" or "priors" of the NLP model) are pre-configured data that affect the configuration of the NLP distribution. For example, at least one hyper-parameter of a particular NLP distribution may be determined based at least in part on preconfigured distribution definition data generated by the NLP system 101 and/or preconfigured distribution configuration data provided to the NLP system 101 by one or more external computing entities 102. In some embodiments, at least some of the hyper-parameters of the NLP distributions utilized by the JST modeling computing entity 106 are stored as part of the distribution hyper-parameter data 122 on the storage subsystem 108. The distribution hyper-parameter data 122 may in some embodiments include at least one of the following: (i) a topic distribution hyper-parameter ($\alpha$) 501 for the input document corpus that includes the digital document, (ii) a cross-document sentiment-distribution parameter ($\gamma$) 502 for the input document corpus, (iii) a per-document initial sentiment hyper-parameter ($\lambda^d$) 503 for the input document, and (iv) a topic-sentiment distribution hyper-parameter ($\beta$) 504 for an input vocabulary collection that includes a list of target words.

In some embodiments, the NLP distributions utilized by the JST modeling computing entity 106 include at least one of the following distributions: a per-document topic distribution ($\theta$) 511 generated by a per-document topic modeling engine 111 of the JST modeling computing entity 106; a per-document topic-sentiment distribution ($\pi$) 512 generated by a per-document topic-sentiment modeling engine 112 of the JST modeling computing entity 106; and a cross-document per-word topic-sentiment distribution ($\varphi$) 513 generated by a cross-document per-word topic-sentiment modeling engine 113 of the JST modeling computing entity 106. The mentioned NLP distributions as well as their respective defining distributions are described in greater detail below with reference to the per-document topic modeling engine 111, the per-document topic-sentiment modeling engine 112, and the cross-document per-word topic-sentiment modeling engine 113.

In addition to the per-document topic modeling engine 111, the per-document topic-sentiment modeling engine 112, and the cross-document per-word topic-sentiment modeling engine 113, the JST modeling computing entity 106 may also have a topic-sentiment modeling engine 114 and a document prioritization engine 115. The topic-sentiment modeling engine 114 may generate a topic-sentiment model and/or a JST latent representation of an input digital document, while the document prioritization engine 115 may generate a predicted priority score for an input digital document based on the JST latent representation of the input digital document.

A. Exemplary JST Modeling Computing Entity

FIG. 2 provides a schematic of a JST modeling computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the JST modeling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the JST modeling computing entity 106 may include, or be in communication with, one or more processing elements 205 (also referred to as processors, processing circuitry, and/or similar terms used herein interchangeably) that communicate with other elements within the JST modeling computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the JST modeling computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the JST modeling computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the JST modeling computing entity 106 with the assistance of the processing element 205 and operating system.

As indicated, in one embodiment, the JST modeling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the JST modeling computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the JST modeling computing entity 106 may include, or be in communication with, one or more input elements, such as a keyboard input, a mouse input, a touch screen/display input, motion input, movement input, audio input, pointing device input, joystick input, keypad input, and/or the like. The JST modeling computing entity 106 may also include, or be in communication with, one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the JST modeling computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the JST modeling computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the JST modeling computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the JST modeling computing entity 106 and/or various other computing entities.

In another embodiment, the external computing entity 102 may include one or more components or functionality that are the same or similar to those of the JST modeling computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

Provided below are techniques for performing JST-based document prioritization as well as exemplary models for performing JST. However, a person of ordinary skill in the relevant technology will recognize that the JST-based document prioritization concepts of the present invention can be implemented using JST latent representations generated using JST models other than the exemplary models for performing JST described herein. Moreover, a person of ordinary skill in the relevant technology will recognize that the exemplary models for performing JST described herein can be used to perform NLP tasks other than document prioritization.

Various embodiments of the present invention disclose techniques for performing JST on data using external (e.g., contextual) information that can be used to train JST models using fewer training iterations and fewer amounts of training data. For example, various embodiments of the present invention disclose integrating predictive insights generated by external information (e.g., user-provided ratings) in adjusting a sentiment distribution hyper-parameter that can be used to generate topic-sentiment distributions. By using the noted technique and related techniques for integrating predictive insights provided by external information to train JST models, various embodiments of the present invention improve computational efficiency of performing training of JST models by training such models using fewer training iterations and fewer amounts of training data. In doing so, various embodiments of the present invention make important technical contributions to improving computational efficiency of performing NLP operations.

Various embodiments of the present invention improve computational efficiency of performing document prioritization by disclosing solutions for utilizing JST latent representations of digital documents produced by JST procedures in performing document prioritization. As discussed above, various embodiments of the present invention improve computational efficiency of performing training of JST models by training such models using fewer training iterations and fewer amounts of training data. Other embodiments of the present invention utilize the JST latent representations of digital documents produced by JST procedures in performing document prioritization. For example, various embodiments of the present invention disclose performing document prioritization based on document-topic entropy measures that are generated based on topic designation probabilities for digital documents and document-sentiment entropy measures that are generated based on sentiment designation probabilities for digital documents, where the topic designation probabilities and sentiment designation probabilities are determined based on JST latent representations determined as an output of a JST procedure. In doing so, various embodiments of the present invention improve the computational efficiency of performing document prioritization by replacing the feature extraction stage of performing document prioritization with the results of a computationally efficient JST procedure. This is another way in which various embodiments of the present invention make important technical contributions to improving computational efficiency of performing NLP operations.

A. Document Prioritization Using Joint Topic-Sentiment Modeling

FIG. 4 is a flowchart diagram of an example process 400 for generating a predicted priority score for a digital document. Via the various steps/operations of the process 400, the JST modeling computing entity 106 can efficiently and effectively train an NLP machine learning model that is configured to integrate contextual information about relationships between words of a digital document, topics associated with a digital document, and sentiments associated with a digital document in determining a predicted priority score for the digital document.

The process 400 begins at step/operation 401 when a document prioritization engine 115 of the JST modeling computing entity 106 identifies a JST latent distribution of the digital document, where the JST latent distribution of the digital document describes one or more topic designation probabilities and one or more sentiment designation probabilities for the digital document. In general, a JST latent distribution may describe at least one feature related to topic associations and sentiment associations of a corresponding digital document. For example, the JST latent distribution for a corresponding digital document may describe at least one of one or more selected topics for the digital document, one or more selected sentiment designations for each selected topic of the one or more selected topics, and one or more word associations from the words used in the digital document for each topic-sentiment pair. As another example, the JST latent distribution for a corresponding digital document may describe at least one of a per-document topic distribution for the digital document, a per-document topic-sentiment distribution for the digital document, and a cross-document per-word topic sentiment distribution for the digital document.

As described above, the JST latent distribution of the digital document describes one or more topic designation probabilities and one or more sentiment designation probabilities for the digital document. A topic designation probability for a corresponding digital document may describe a predicted level of association between a corresponding topic designation and the corresponding digital document. In some embodiments, a digital document may be associated with T topic designation probabilities, where T describes a count of a set of candidate topic designations, and where each topic designation probability of the T topic designation probabilities describes a predicted level of association between a corresponding topic designation of the T candidate topic designations and the noted digital document. In some embodiments, the topic designation probabilities associated with a digital document are determined based on a per-document topic distribution for the digital document, where the per-document topic distribution for the digital document is in turn determined via processing the digital document using a trained JST machine learning model, such as a trained embedding-enhanced labeled JST (ELJST) machine learning model. In some embodiments, the document prioritization engine 115 may determine the topic designation probabilities for a digital document by identifying a JST latent representation of the digital document which describes a per-document topic distribution and then subsequently determine the topic designation probabilities for the digital document based on the per-document topic distribution for the digital document as described by the JST latent representation of the digital document.

Moreover, a sentiment designation probability for a corresponding digital document may describe a predicted level of association between a corresponding sentiment designation and the corresponding digital document. In some embodiments, a digital document may be associated with S sentiment designation probabilities, where S describes a count of a set of candidate sentiment designations, and where each sentiment designation probability of the T sentiment designation probabilities describes a predicted level of association between a corresponding sentiment designation of the S candidate sentiment designations and the noted digital document. In some embodiments, the sentiment designation probabilities associated with a digital document are determined based on a per-document topic-sentiment distribution for the digital document, where the per-document topic-sentiment distribution for the digital document is determined via processing the digital document using a trained JST machine learning model, such as a trained ELJST machine learning model. In some embodiments, the document prioritization engine 115 may determine the sentiment designation probabilities for a digital document by identifying a JST latent representation of the digital document which describes a per-document topic-sentiment distribution and then subsequently determine the sentiment designation probabilities for the digital document based on the per-document topic-sentiment distribution for the digital document as described by the JST latent representation of the digital document.

As described above, the topic designation probabilities and the sentiment designation probabilities can be used to generate a JST latent distribution, where the JST latent distribution can in turn be determined based on per-document topic distributions and per-document topic-sentiment distributions, and where the per-document topic distributions and the per-document topic-sentiment distributions can in turn be determined using an ELJST machine learning model. An ELJST machine learning model is an example of a JST machine learning model.

In general, a JST machine learning model is configured to generate features about a topic-sentiment distribution of a digital document. In some embodiments, a JST machine learning model may be configured to determine at least one of a topic distribution for an input digital document as well as a sentiment distribution for each selected topic. For example, an exemplary JST machine learning model may be configured to determine that an input digital document is associated with a topic related to customer service quality and has a positive sentiment with respect to the noted topic. In some embodiments, a JST machine learning model may be configured to determine at least one of a topic distribution for an input digital document, a sentiment distribution for each selected topic, and a word distribution for each topic-sentiment pair. For example, an exemplary JST machine learning model may be configured to determine that an input digital document is associated with a topic related to customer service quality, has a positive sentiment with respect to the noted topic, and that the conclusion related to the positive sentiment of the input digital document with respect to the topic related to customer service quality is supported by the sets of words "great customer interaction" and "very helpful to customers".

An ELJST machine learning model may be a JST machine learning model that is configured to process words as word embeddings using a word embedding model that enables inferring semantic similarity across words and placing semantically similar words under common topic-sentiment labels. For example, an exemplary ELJST machine learning model may be configured to process word embeddings using a Markov Random Field (MRF) regularized model that creates an undirected graph for each input digital document by constructing edges between contextually and semantically similar words, which enables formulating a well-defined potential function to enhance topic identification. In some embodiments, the ELJST machine learning model utilizes a prior topic label and/or a prior sentiment label of a digital document, such as an NPS-based sentiment score of a digital document and/or a user-provided rating for a feedback digital document. Operational examples of features related to ELJST machine learning models are described in Subsection B of the present section.

In some embodiments, performing the operations of the ELJST machine learning model comprises performing operations of the below-outlined Procedure 1:

Procedure 1

1. For each document d
    Generate $\theta_d \sim \text{Dir}(\alpha)$;
2. For each document d and topic $j \in \{1, 2, \ldots T\}$
    Choose $\pi_{d,j} \sim \text{Dir}(\gamma^{(d)})$, $\gamma^{(d)} = \gamma \times L^{(d)}$;
3. For each topic $j \in \{1, 2, \ldots T\}$ and sentiment label $l \in \{1, 2, \ldots S\}$
    Choose $\varphi_{j,l} \sim \text{Dir}(\beta)$;
4. For each word $w_i$ in document d
    (a) Choose topic $z_i \sim \text{Mult}(\theta_d)$;
    (b) Choose sentiment label $l_i \sim \text{Mult}(\pi_{d,z_i})$;
    (c) Choose word $w_i \sim \text{Mult}(\varphi_{z_i,l_i})$, a multinomial distribution over words conditioned on sentiment level $l_i$ and topic $z_i$.

Returning to FIG. 4, at step/operation 402, the document prioritization engine 115 of the JST modeling computing entity 106 processes the topic designation probabilities using a document-topic entropy determination machine learning model to generate a document-topic entropy measure for the digital document. A document-topic entropy measure for a corresponding digital document may describe a measure of topical association diversity of the corresponding digital document. For example, when a first digital document is predicted to be strongly associated with one topic designation while a second digital document is predicted to be strongly associated with two topic designations, the second document may have a higher document-topic entropy measure. In some embodiments, given a set of T candidate topic designations each having a topic designation probability with respect to a particular digital document, the document-topic entropy measure for the particular digital document may be determined based on each of the T topic designation probabilities associated with the particular digital document.

The document-topic entropy machine learning model may be configured to process at least a portion of the topic designation probabilities for an input digital document in order to generate a document-topic entropy measure for the digital document. For example, given a set of T candidate topic designations each having a topic designation probability with respect to a particular digital document, the document-topic entropy machine learning model may be configured to process the T topic designation probabilities associated with the particular digital document to generate the document-topic entropy measure for the particular digital document. In some embodiments, to generate the document-topic entropy measure for an input digital document, the document-topic entropy machine learning model may be configured to perform at least some of the operations of the equation $H(d) = \Sigma_{k=1}^{T} p_k(d) \log (p_k^{(d)})$, where $H(d)$ is the document-topic entropy measure of the input digital document d, k is an index variable that iterates over T candidate topic designations, and $p_k^{(d)}$ is the topic designation probability of assigning $k^{th}$ topic designation to the input digital document d.

At step/operation 403, the document prioritization engine 115 of the JST modeling computing entity 106 processes the sentiment designation probabilities using a document-sentiment entropy determination machine learning model to generate a document-sentiment entropy measure for the digital document. A document-sentiment entropy measure for a corresponding digital document may describe a measure of sentiment association diversity of the corresponding digital document. For example, when a first digital document is predicted to be strongly associated with one sentiment designation while a second digital document is predicted to be strongly associated with two sentiment designations, the second document may have a higher document-sentiment entropy measure. In some embodiments, given a set of S candidate sentiment designations each having a sentiment designation probability with respect to a particular digital document, the document-sentiment entropy measure for the particular digital document may be determined based on each of the S sentiment designation probabilities associated with the particular digital document.

The document-sentiment entropy machine learning model may be configured to process at least a portion of the sentiment designation probabilities for an input digital document in order to generate a document-sentiment entropy measure for the digital document. For example, given a set of S candidate sentiment designations each having a sentiment designation probability with respect to a particular digital document, the document-topic entropy machine learning model may be configured to process the S sentiment designation probabilities associated with the particular digital document to generate the document-sentiment entropy measure for the particular digital document. In some embodiments, to generate the document-sentiment entropy measure for an input digital document, the document-sentiment entropy machine learning model may be configured to perform at least some of the operations of the equation $I(d) = \Sigma_{k=1}^{S} p_k^{(d)} \log(p_k^{(d)})$, where $I(d)$ is the document-sentiment entropy measure of the input digital document d, k is an index variable that iterates over S candidate sentiment designations, and $p_k^{(d)}$ is the sentiment designation probability of assigning $k^{th}$ sentiment designation to the input digital document d.

At step/operation 404, the document prioritization engine 115 of the JST modeling computing entity 106 processes one or more per-word inverse domain frequency measures for the digital document using a document popularity determination machine learning model to generate a document popularity measure for the digital document. In general, a document popularity measure may describe a measure of word usage uniqueness of an input digital document across an input document corpus that includes the input digital document. For example, given an input document corpus that includes a first digital document and a second digital document, and further given that the first digital document consists of words that are common across the input document corpus while the second digital document consists of words that are uncommon across the input document corpus, the first digital document corpus will likely have a higher document popularity measure relative to the second digital document. In some embodiments, the document popularity measure for a particular digital document is determined based on the per-word inverse domain frequency measures for at least some of the words used in the digital document. The per-word inverse domain frequency may describe the frequency of usage of a corresponding word within an input document corpus that includes a set of digital documents. For example, the per-word inverse domain frequency for a corresponding word may describe an Inverse Domain Frequency (IDF) score for the corresponding word, where the IDF score is determined in accordance with the Term Frequency-Inverse Domain Frequency (TF-IDF) algorithm.

A document popularity determination machine learning model may be configured to generate the document popularity measure for an input digital document based on one or more per-word inverse domain frequency measures for the digital document. In some embodiments, to determine the document popularity measure for a particular digital document, the document popularity determination machine learning model may process the per-word inverse domain frequency measures for at least some of the words used in the digital document. In some embodiments, to determine the document popularity measure for a particular digital document, the document popularity determination machine learning model performs at least some of the operations of the equation $$P(d) = \sqrt[N_d]{\prod_{i=1}^{N_d} w_{(d,i)}},$$

where P(d) is the document popularity measure for the particular digital document d, i is an index variable that iterates over $N_d$ selected words of the particular digital document d (e.g., over all of the words of the particular digital document d, over non-stop words of the particular digital document d, and/or the like), and $w_{(d,i)}$ is the per-word inverse domain frequency measures of word i in the particular digital document d.

At step/operation 405, the document prioritization engine 115 of the JST modeling computing entity 106 processes the document-topic entropy measure for the digital document, the sentiment-topic entropy measure for the digital document, and the document popularity measure for the digital document to generate the predicted priority score for the digital document. In general, a document priority score describes a likelihood that a corresponding digital document includes important content relative to other digital documents. For example, in some embodiments, when a digital document has a lower document-topic entropy measure, it is deemed to have strong associations with a fewer number of topics and thus the digital document is deemed to have a lower predicted priority score. As another example, in some embodiments, when a digital document has a lower document-sentiment entropy measure, it is deemed to have strong associations with a fewer number of sentiments and thus the digital document is deemed to have a lower predicted priority score. As yet another example, in some embodiments, when a digital document has a lower document priority measure, it is deemed to have more unique words and thus the digital document is deemed to have a lower predicted priority score. In some embodiments, the predicted priority score for a digital document is determined based on an aggregation model that is configured to process the document-topic entropy measure for the digital document, the sentiment-topic entropy measure for the digital document, and the document popularity measure for the digital document to generate the predicted priority score for the digital document, where the aggregation model is configured to define a negative relationship between the predicted priority score for the digital document and at least one of the document-topic entropy measure for the digital document, the sentiment-topic entropy measure for the digital document, and the document popularity measure for the digital document. In some embodiments, the predicted priority score for a digital document is determined based on an aggregation model that is configured to process the document-topic entropy measure for the digital document, the sentiment-topic entropy measure for the digital document, and the document popularity measure for the digital document to generate the predicted priority score for the digital document, where the aggregation model is configured to define a negative relationship between the predicted priority score for the digital document and each of the document-topic entropy measure for the digital document, the sentiment-topic entropy measure for the digital document, and the document popularity measure for the digital document.

At step/operation 406, the document prioritization engine 115 of the JST modeling computing entity 106 performs one or more prediction-based actions based on the predicted priority score for the digital document. Examples of prediction-based actions include generating notifications that describe the predicted priority score for the digital document, generating user interfaces describe the predicted priority score for the digital document, generating document reviewer alerts based on the predicted priority score for the digital document, performing operational load balancing actions based on the predicted priority score for the digital document, and/or the like.

For example, in some embodiments, the document prioritization engine 115 may generate a prediction output user interface that describes, for each digital document of one or more digital documents, a predicted priority score. An operational example of such a prediction output user interface 600 is depicted in FIG. 6.

As depicted in FIG. 6, the prediction output user interface 600 describes a predicted priority score from the range [0, 10] for each designated digital document. For example, the prediction output user interface 600 describes that the digital document identified as Complaint_001 has a priority score of 7.1. The prediction output user interface 600 further enables ranking the identified digital documents based on alphabetical precedence of their names and/or based on the numeric precedence of their respective predicted priority scores.

B. Embedding-Enhanced Labeled Joint Topic Sentiment Machine Learning Models

As described above, the topic designation probabilities and the sentiment designation probabilities can be used to generate a JST latent distribution, where the JST latent distribution can in turn be determined based on per-document topic distributions and per-document topic-sentiment distributions, and where the per-document topic distributions and the per-document topic-sentiment distributions can in turn be determined using an ELJST machine learning model. An operational example of such an ELJST machine learning model 500 is depicted in FIG. 5. As depicted in FIG. 5, the inputs to the ELJST machine learning model include: (i) a topic distribution hyper-parameter ($\alpha$) 501 for the input document corpus that includes the digital document, (ii) a cross-document sentiment-distribution parameter ($\gamma$) 502 for the input document corpus, (iii) a per-document initial sentiment hyper-parameter ($\lambda^d$) 503 for the input document, and (iv) a topic-sentiment distribution hyper-parameter ($\beta$) 504 for an input vocabulary collection that includes a list of target words.

The topic distribution hyper-parameter ($\alpha$) 501 may be a data value associated with an input document corpus and a range of candidate topic designations that indicates the likelihood that each digital document in the input document corpus may be associated with all candidate topic designations in the range of candidate topic designations. In some embodiments, the topic distribution hyper-parameter ($\alpha$) 501 for an input document corpus and a range of candidate topic designations may indicate a measure of statistical distribution (e.g., an average and/or median) of multi-topic-inclusivity of the digital documents in the input document corpus in relation to the range of candidate topic designations. For example, if each digital document in an input document corpus may be associated with at least one candidate topic designation selected from a range of three candidate topic designations T1, T2, and T3, the topic distribution hyper-parameter ($\alpha$) 501 may indicate a likelihood that each digital document in the input document corpus will be associated with each of the three candidate topic designations T1, T2, and T3. In the noted example, a high value of the topic distribution hyper-parameter ($\alpha$) 501 for the noted input document corpus may indicate a high likelihood that each digital document in the input document corpus is associated with each candidate topic designations of the three candidate topic designations T1, T2, and T3, while a low value of the topic distribution hyper-parameter ($\alpha$) 501 for the noted input document corpus may indicate a low likelihood that each digital document in the input document corpus is associated with each candidate topic designations of the three candidate topic designations T1, T2, and T3.

The sentiment distribution hyper-parameter ($\gamma$) 502 for an input document corpus, a range of candidate topic designations, and a range of candidate sentiment designations may be a data value configured to indicate a likelihood that each digital document in the input document corpus includes a threshold per-document topic-sentiment correlation value for each topic-sentiment pair of a candidate topic designation from the range of candidate topic designations and a candidate sentiment designation from the range of candidate sentiment designations. For example, if each digital document in an input document corpus may be associated with at least one candidate topic designation selected from a range of three candidate topic designations T1, T2, and T3 as well as at least one candidate sentiment designation selected from a range of three candidate sentiment designations S1, S2, and S3, the sentiment distribution hyper-parameter ($\gamma$) 502 for the input document corpus may indicate the likelihood that each document in the input document corpus will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the sentiment distribution hyper-parameter ($\gamma$) 502 for the noted input document corpus may indicate a high likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of the sentiment distribution hyper-parameter ($\gamma$) 502 for the noted input document corpus may indicate a low likelihood that each digital document in the input document corpus is associated with all of the sentiment-topic pairs (T1, S1), (T1, S2), (T1, S3), (T2, S1), (T2, S2), (T2, S3), (T3, S1), (T3, S2), and (T3, S3).

The per-document initial sentiment hyper-parameter ($\lambda$) 503 for a digital document may be a value configured to indicate at least one aspect of initial sentiment information associated with the digital document. As indicated above, the NLP inputs provided to the NLP system 101 by the external computing entities 102 may include initial sentiment information associated with at least one digital document in an input document corpus. Such initial sentiment information, which may be stored as part of the initial sentiment data 124 in the storage subsystem and retrieved therefrom, can be used to in part define a per-document topic-sentiment distributions (π) 511 for those digital documents that have corresponding initial sentiment information. In some embodiments, to generate the per-document topic-sentiment correlation indicators for a particular document having particular initial sentiment information, the per-document topic-sentiment modeling engine 112 may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter (γ) 502 for the input document corpus that includes the particular digital document and a per-document initial sentiment hyper-parameter ($\lambda^d$) 503 for the particular digital document.

The topic-sentiment distribution hyper-parameter (β) 504 for a vocabulary collection, a range of candidate topic designations, and a range of candidate sentiment designations may be a data value configured to indicate a likelihood that each word in the vocabulary collection has a threshold correlation with each topic-sentiment pair of a candidate topic designation from the range of candidate topic designations and a candidate sentiment designation from the range of candidate sentiment designations. For example, if each word in a vocabulary collection may be associated with at least one candidate topic designation selected from a range of three candidate topic designations T1, T2, and T3 as well as at least one candidate sentiment designation selected from a range of three candidate sentiment designations S1, S2, and S3, the topic-sentiment distribution hyper-parameter (β) 504 for the vocabulary collection may indicate the likelihood that each word in the vocabulary collection will be associated with all of the sentiment-topic pairs (T1, S1), (T1, S2), (T1, S3), (T2, S1), (T2, S2), (T2, S3), (T3, S1), (T3, S2), and (T3, S3). In the noted example, a high value of the topic-sentiment distribution hyper-parameter (β) 504 for the vocabulary collection may indicate a high likelihood that each word in the vocabulary collection is associated with all of the sentiment-topic pairs (T1, S1), (T1, S2), (T1, S3), (T2, S1), (T2, S2), (T2, S3), (T3, S1), (T3, S2), and (T3, S3); meanwhile, a low value of topic-sentiment distribution hyper-parameter (β) 504 for the vocabulary collection may indicate a low likelihood that each word in the vocabulary collection corpus is associated with all of the sentiment-topic pairs (T1, S1), (T1, S2), (T1, S3), (T2, S1), (T2, S2), (T2, S3), (T3, S1), (T3, S2), and (T3, S3).

As further depicted in FIG. 5, to perform a part of the operations corresponding to the ELJST machine learning model 500, the per-document topic modeling engine 111 of the JST modeling computing entity 106 receives the topic distribution hyper-parameter (α) 501 for the input document corpus. Thereafter, the per-document topic modeling engine 111 utilizes the topic distribution hyper-parameter (α) 501 for the input document corpus to generate the per-document topic distribution (θ) 511 for the input document. In some embodiments, to generate the per-document topic distribution (θ) 511 for the input document, the per-document topic modeling engine 111 generates a Dirichlet distribution over the topic distribution hyper-parameter (α) 501 for the input document corpus. The per-document topic modeling engine 111 then provides the generated per-document topic distribution (θ) 511 for the input document to the topic-sentiment modeling engine 114 of the JST modeling computing entity 106.

The per-document topic distribution for an input document corpus and a range of candidate topic designations may be a distribution that indicates a per-document correlation indicator for each document-topic pair of a digital document in the input document corpus and a candidate topic designation from the range of candidate topic designations. For example, given an input document corpus that includes four digital documents D1, D2, D3, and D4, and further given a range of two candidate topic designations T1 and T2, the per-document topic distribution (θ) 511 for the input corpus may indicate that document D1 is 30% associated with T1 and 70% associated with T2; document D2 is 60% associated with T1 and 40% associated with T2; document D3 is 80% associated with T1 and 20% associated with T2; and document D4 is 50% associated with T1 and 50% associated with T2. In the described example, the values 0.30, 0.70, 0.60, 0.40, 0.80, 0.20, 0.50, and 0.50 may be referred to as per-document topic correlation indicators for document-topic pairs (D1, T1), (D1, T2), (D2, T1), (D2, T2), (D3, T1), and (D4, T2) respectively. In some embodiments, to generate the per-document topic distribution (θ) 511, the per-document topic modeling engine 111 may utilize a topic distribution hyper-parameter (α) 501, which may be stored as part of the distribution hyper-parameter data 122 on the storage subsystem 108. In some embodiments, the per-document topic modeling engine 111 generates the per-document topic distribution (θ) 511 for an input document corpus and a range of candidate topic designations based at least in part on a distribution over the topic distribution hyper-parameter (α) 501 for the input document corpus and the range of candidate topic designations (e.g., a Dirichlet distribution over the topic distribution hyper-parameter (α) 501 for the input document corpus and the range of candidate topic designations).

As further depicted in FIG. 5, to perform another part of the operations corresponding to the ELJST machine learning model 500, the per-document topic-sentiment modeling engine 112 of the JST modeling computing entity 106 first adjusts a cross-document sentiment-distribution parameter (γ) 502 for the input document corpus based at least in part on a per-document initial sentiment hyper-parameter ($\lambda^d$) 503 for the input document in order to generate a per-document sentiment distribution hyper-parameter ($\gamma^d$) for the input document. In some embodiments, the per-document topic-sentiment modeling engine 112 first retrieves the cross-document sentiment-distribution parameter (γ) 502 for the input document corpus and the per-document initial sentiment hyper-parameter ($\lambda^d$) 503 for the input document from the distribution hyper-parameter data 122 stored on the storage subsystem. Afterward, the per-document topic-sentiment modeling engine 112 generates per-document sentiment distribution hyper-parameter ($\gamma^d$) for the input document based at least in part on the cross-document sentiment-distribution parameter (γ) 502 for the input document corpus and the per-document initial sentiment hyper-parameter ($\lambda^d$) 503 for the input document. In some embodiments, the per-document topic-sentiment modeling engine 112 of the JST modeling computing entity 106 further determines the per-document initial sentiment hyper-parameter ($\lambda^d$) 503 for the input document based at least in part on the initial sentiment data 124 for the input document. In some embodiments, if the input document lacks any associated initial sentiment information and/or any associated initial sentiment hyper-parameters ($\lambda^d$) 503, the per-document topic-sentiment modeling engine 112 does not perform any adjustments on the cross-document sentiment-distribution parameter (γ) 502 for the input document corpus based at least in part on the per-document initial sentiment hyper-parameter ($\lambda^d$) 503 for the input document in order to generate the per-document sentiment distribution hyper-parameter ($\gamma^d$) for the input document.

As further depicted in FIG. 5, to perform another part of the operations corresponding to the ELJST machine learning model 500, after generating the per-document sentiment distribution hyper-parameter ($\gamma^d$) for the input document, the per-document topic-sentiment modeling engine 112 proceeds to generate the per-document topic-sentiment distribution ($\pi$) 512 for the input document based at least in part on the per-document sentiment distribution hyper-parameter ($\gamma^d$) for the input document. In some embodiments, to generate the per-document topic-sentiment distribution ($\pi$) 512 for the input document, the per-document topic-sentiment modeling engine 112 generates a Dirichlet distribution over the per-document sentiment distribution hyper-parameter ($\gamma^d$) for the input document. The per-document topic-sentiment modeling engine 112 then provides the generated per-document topic-sentiment distribution ($\pi$) 512 for the input document to the topic-sentiment modeling engine 114 of the JST modeling computing entity 106.

The per-document topic-sentiment distribution ($\pi$) 512 for an input document corpus, a range of candidate topic designations, and a range of candidate sentiment designations may be a distribution that indicates, for each digital document in the input document corpus, a corresponding per-document topic-sentiment correlation indicator for each topic-sentiment pair of a candidate topic designation from the range of candidate topic designations and candidate sentiment designation from the range of candidate sentiment designations. For example, given an input document corpus that includes two digital documents D1 and D2, the range of candidate topic designations T1 and T2, and the range of candidate sentiment destinations S1 and S2, the corresponding per-document topic-sentiment distribution ($\pi$) 512 may indicate that: (i) to the extent document D1 relates to topic T1, document D1 has a 90% ratio of sentiment S1 and a 10% ratio of sentiment S2; (ii) to the extent document D1 relates to topic T2, document D1 has a 30% ratio of sentiment S1 and a 70% ratio of sentiment S2; (iii) to the extent document D2 relates to topic T1, document D2 has a 40% ratio of sentiment S1 and a 60% ratio of sentiment S2; and (iv) to the extent document D2 relates to topic T2, document D1 has a 50% ratio of sentiment S1 and a 50% ratio of sentiment S2. In the mentioned examples, digital document D1 may be associated with per-document sentiment correlation indicators 0.90 and 0.10 for topic-sentiment pairs (T1, S1) and (T1, S2) respectively and per-document sentiment correlation indicators 0.30 and 0.70 for topic-sentiment pairs (T2, S1) and (T2, S2) respectively. Moreover, in the mentioned examples, digital document D2 may be associated with per-document sentiment correlation indicators 0.40 and 0.60 for topic-sentiment pairs (T1, S1) and (T1, S2) respectively and per-document sentiment correlation indicators 0.50 and 0.50 for topic-sentiment pairs (T2, S1) and (T2, S2) respectively. In some embodiments, to generate the per-document topic-sentiment distribution ($\pi$) 512 for a particular digital document in an input document corpus, the per-document topic-sentiment modeling engine 112 may utilize a per-document sentiment distribution hyper-parameter ($\gamma^d$) for the particular digital document, where the document sentiment distribution hyper-parameter ($\gamma^d$) for the particular digital document is in turn determined based at least in part on at least one of a cross-document sentiment distribution hyper-parameter ($\gamma$) 502 for the input document corpus and a per-document initial sentiment hyper-parameter ($\lambda^d$) 503 for the particular digital document. For example, the per-document topic-sentiment modeling engine 112 may first generate a per-document sentiment distribution hyper-parameter ($\gamma^d$) for a particular digital document in an input document corpus based at least in part on the cross-document sentiment distribution hyper-parameter ($\gamma$) 502 for the input document corpus and (if such information is available for the particular digital document) the per-document initial sentiment hyper-parameter ($\lambda^d$) 503 for the particular digital document. Afterward, the per-document topic-sentiment modeling engine 112 may generate the per-document topic-sentiment distribution ($\pi$) 512 for the particular digital document as a distribution over the per-document sentiment distribution hyper-parameter ($\gamma^d$) for the particular digital document (e.g., a Dirichlet distribution over the per-document sentiment distribution hyper-parameter ($\gamma^d$) for the particular digital document).

As further depicted in FIG. 5, to perform another part of the operations corresponding to the ELJST machine learning model 500, the cross-document per-word topic-sentiment modeling engine 113 of the JST modeling computing entity 106 receives a topic-sentiment distribution hyper-parameter ($\beta$) 504 for an input vocabulary collection. Thereafter, the per-document topic modeling engine 111 utilizes the topic-sentiment distribution hyper-parameter ($\beta$) 504 for the input vocabulary collection to generate a cross-document per-word topic-sentiment distribution ($\varphi$) 513 for the input vocabulary collection. Importantly, the a cross-document per-word topic-sentiment distribution ($\varphi$) 513 is a cross-document distribution (a.k.a. a "global" distribution) whose values do not correspond to the input document and/or the input document corpus. In some embodiments, to generate the cross-document per-word topic-sentiment distribution ($\varphi$) 513 for the input vocabulary collection, cross-document per-word topic-sentiment modeling engine 113 generates a Dirichlet distribution over the topic-sentiment distribution hyper-parameter ($\beta$) 504 for the input vocabulary collection. The cross-document per-word topic-sentiment modeling engine 113 then provides the cross-document per-word topic-sentiment distribution ($\varphi$) 513 for the input vocabulary collection to the topic-sentiment modeling engine 114 of the JST modeling computing entity 106.

The cross-document per-word topic-sentiment distribution ($\varphi$) 513 for an input vocabulary collection, a range of candidate topic designations, and a range of candidate sentiment designations is a distribution that indicates for, each word in the vocabulary collection, a corresponding per-word topic-sentiment correlation indicator for each topic-sentiment pair of a candidate topic designation from the range of candidate topic designations and candidate sentiment designation from the range of candidate sentiment designations. For example, given a vocabulary collection that includes words W1, W2, and W3, the range of candidate topic designations T1 and T2, and the range of candidate sentiment destinations S1 and S2, the corresponding cross-document per-word topic-sentiment distribution ($\varphi$) 513 may indicate that: (i) when word W1 occurs in relation to topic T1, word W1 has a 70% ratio of sentiment S1 and a 30% ratio of sentiment S2; (ii) when word W1 occurs in relation to topic T2, word W1 has a 80% ratio of sentiment S1 and a 20% ratio of sentiment S2; (iii) when word W2 occurs in relation to topic T1, word W2 has a 60% ratio of sentiment S1 and a 40% ratio of sentiment S2; (iv) when word W2 occurs in relation to topic T2, document D1 has a 80% ratio of sentiment S1 and a 20% ratio of sentiment S2; (v) when word W3 occurs in relation to topic T1, word W3 has a 40% ratio of sentiment S1 and a 60% ratio of sentiment S2; (vi) when word W3 occurs in relation to topic T2, document D1 has a 70% ratio of sentiment S1 and a 30% ratio of sentiment S2. In the above-mentioned example, word W1 is associated with the following cross-document per-word topic-sentiment correlation indicators: 0.70 for topic-sentiment pair (T1, S1), 0.30 for topic-sentiment pair (T1, S2), 0.80 for topic-sentiment pair (T2, S1), and 0.20 for topic-sentiment pair (T2, S2). Furthermore, in the above-mentioned example, word W2 is associated with the following cross-document per-word topic-sentiment correlation indicators: 0.60 for topic-sentiment pair (T1, S1), 0.40 for topic-sentiment pair (T1, S2), 0.80 for topic-sentiment pair (T2, S1), and 0.20 for topic-sentiment pair (T2, S2). Moreover, in the above-mentioned example, word W3 is associated with the following cross-document per-word topic-sentiment correlation indicators: 0.40 for topic-sentiment pair (T1, S1), 0.60 for topic-sentiment pair (T1, S2), 0.70 for topic-sentiment pair (T2, S1), and 0.40 for topic-sentiment pair (T2, S2). In some embodiments, to generate a cross-document per-word topic-sentiment distribution ($\varphi$) 513, the cross-document per-word topic-sentiment modeling engine 113 may utilize a topic-sentiment distribution hyper-parameter ($\beta$) 504. For example, the cross-document per-word topic-sentiment modeling engine 113 may generate the cross-document per-word topic-sentiment distribution ($\varphi$) 513 for a vocabulary collection, a range of candidate topic designations, and a range of candidate sentiment designations as a distribution over the topic-sentiment distribution hyper-parameter ($\beta$) 504 for the vocabulary collection, the range of candidate topic designations, and the range of candidate sentiment designations (e.g., a Dirichlet distribution over the topic-sentiment distribution hyper-parameter ($\beta$) 504 for the vocabulary collection, the range of candidate topic designations, and the range of candidate sentiment designations).

As further depicted in FIG. 5, to perform another part of the operations corresponding to the ELJST machine learning model 500, the topic-sentiment modeling engine generates one or more topic designations (z) 521 for each word in the input document based at least in part on the per-document topic distribution ($\theta$) 401 for the input document. In some embodiments, to select the one or more topic designations (z) 521 for each word in the input document based at least in part on the per-document topic distribution ($\theta$) 401 for the input document, the topic-sentiment modeling engine 114 samples the topic designations (z) 521 from a range of candidate topic designations associated with the per-document topic distribution ($\theta$) 401 for the input document based at least in part on a distribution over probability values defined by the per-document topic distribution ($\theta$) 401 for the input document. In some of those embodiments, to select the one or more topic designations (z) 521 for each word in the input document based at least in part on the per-document topic distribution ($\theta$) 401 for the input document, the topic-sentiment modeling engine 114 samples the topic designations (z) 521 from the range of candidate topic designations based at least in part on a multinomial distribution over probability values defined by the per-document topic distribution ($\theta$) 401 for the input document.

As further depicted in FIG. 5, to perform another part of the operations corresponding to the ELJST machine learning model 500, the topic-sentiment modeling engine 114 selects one or more sentiment designations (l) 522 (e.g., discrete sentiment labels and/or continuous sentiment values) for each word in the input document based at least in part on the per-document topic-sentiment distribution ($\pi$) 402 for the input document. In some embodiments, to select the sentiment designations (l) 522 for the input document based at least in part on the per-document topic-sentiment distribution ($\pi$) 402 for the input document, the topic-sentiment modeling engine 114 samples the sentiment designations (l) 522 from a range of candidate sentiment designations associated with the per-document topic-sentiment distribution ($\pi$) 402 for the input document based at least in part on a distribution over probability values defined by the per-document topic-sentiment distribution ($\pi$) 402 for the input document and the selected topic designations (z) 521 for the particular word. In some of those embodiments, to select the sentiment designations (l) 522 for the input document based at least in part on the per-document topic-sentiment distribution ($\pi$) 402 for the input document, the topic-sentiment modeling engine 114 samples the sentiment designations (l) 522 from the range of candidate sentiment designations based at least in part on a multinomial distribution over probability values defined by the per-document topic-sentiment distribution ($\pi$) 402 for the input document and the selected topic designations (z) 521 for the particular word.

As further depicted in FIG. 5, to perform another part of the operations corresponding to the ELJST machine learning model 500, the topic-sentiment modeling engine 114 of the JST modeling computing entity 106 selects one or more word associations (w) 523 for each word in the input document based at least in part on the cross-document per-word topic-sentiment distribution ($\varphi$) 403 for the input vocabulary collection. In some embodiments, to select the word associations (w) 523 for each word in the input document based at least in part on the cross-document per-word topic-sentiment distribution ($\varphi$) 403 for the input vocabulary collection, the topic-sentiment modeling engine 114 samples the word associations (w) 523 from the input vocabulary collection based at least in part on a distribution over probabilities defined by the cross-document per-word topic-sentiment distribution ($\varphi$) 403 for the input vocabulary collection, the topic designations (z) 521 for the word, and the sentiment designations (l) 522 for the word. In some of those embodiments, to select the word associations (w) 523 for each word in the input document based at least in part on the cross-document per-word topic-sentiment distribution ($\varphi$) 403 for the input vocabulary collection, the topic-sentiment modeling engine 114 samples the word associations (w) 523 from the input vocabulary collection based at least in part on a multinomial distribution over probabilities defined by the cross-document per-word topic-sentiment distribution ($\varphi$) 403 for the input vocabulary collection, the topic designations (z) 521 for the word, and the sentiment designations (l) 522 for the word. In some embodiments, to retrieve words from the input vocabulary collection in accordance with the cross-document per-word topic-sentiment distribution ($\varphi$) 403 for the input vocabulary collection as part of generating the word associations (w) 523 for each word in the input document, the topic-sentiment modeling engine 114 analyzes the retrieved words as n-grams.

The intermediate output of the ELJST machine learning model 500 may be used to generate at least one of a per-document topic distribution for the input document, a per-document topic-sentiment distribution for each input document, and a cross-document per-word topic-sentiment distribution. In some embodiments, the cross-document per-word topic-sentiment distribution is associated with the input document and/or associated with a vocabulary collection related to the input document. For example, if the input document relates to a medical topic, the cross-document per-word topic-sentiment distribution may entail cross-document per-word topic-sentiment correlation indicators for the medical field (e.g., cross-document per-word topic-sentiment correlation indicators extracted from a medical dictionary and/or from a medical semantic database).

An exemplary per-document topic distribution data object 700 that includes per-document topic distributions for three documents is presented in FIG. 7. As depicted in the per-document topic distribution data object 700, each per-document topic distribution 711-713 for a particular digital document associates the corresponding document for the per-document topic distribution 711-713 with a group of per-document topic correlation indicators, where each per-document topic-correlation indicator indicates a predicted magnitude of correlation between a corresponding document and a corresponding topic designation. For example, as depicted in the per-document topic distribution data object 700, document 1 and topic 1 are associated with the per-document topic correlation indicator 0.75, while document 3 and topic 2 are associated with the per-document topic correlation indicator 0.4.

An exemplary per-document topic-sentiment distribution data object 800 that includes three per-document topic-sentiment distributions 811-813 for three documents is depicted in FIG. 8. Each of the three per-document topic-sentiment distributions 811-813 is associated with various per-document topic-sentiment correlation indicators for various topic-sentiment pairs. For example, as depicted in the per-document topic-sentiment distribution 811, document 1 is associated with the per-document topic-sentiment correlation indicator 0.6 for the topic-sentiment pair (Topic 2, Sentiment +ve) and the per-document topic-sentiment correlation indicator 0.8 for the topic-sentiment pair (Topic 3, Sentiment −ve).

An exemplary embodiment of cross-document per-word topic-sentiment distribution data 900 for four words (e.g., words "claim", "service", "excellent", and "rx"), three candidate topic designations (e.g., candidate topic designations corresponding to topics 1, 2, and 3), and two candidate sentiment designations (e.g., candidate sentiment designations corresponding to sentiments +ve and −ve) is depicted in FIG. 9. For example, as depicted in the cross-document per-word topic-sentiment distribution data object 911, word "claim" is associated with the cross-document per-word topic-sentiment correlation indicator 0.4 for the topic-sentiment pair (Topic 1, Sentiment +ve) and the cross-document per-word topic-sentiment correlation indicator 0.05 for the topic-sentiment pair (Topic 3, Sentiment +ve). Although the data objects 911-912 depicted in FIG. 9 are each characterized by association with a corresponding candidate sentiment designation, one of ordinary skill in the art will recognize that other cross-document per-word topic-sentiment distribution data may be characterized by association with at least one of candidate sentiment designations, candidate topic designations, and words.

The final output of the ELJST machine learning model 500 may be used to generate JST modeling outputs for a digital document. Operational examples of JS modeling outputs are presented in FIGS. 10-15 described in greater detail below. However, one of ordinary skill in the art will recognize that the topic-sentiment modeling engine 114 may generate any JST modeling output that uses at least one of one or more per-word topic designations, one or more per-word sentiment designations, one or more per-document topic-designations, one or more per-document sentiment designations, one or more cross-document topic designations, one or more cross-document sentiment designations, and/or the like.

For example, when the JST modeling outputs may include at least one of the following: (i) one or more per-document topic designations for each of one or more digital documents; (ii) one or more per-document sentiment designations for each of the one or more digital documents; (iii) one or more per-document topic-specific sentiment designations for each of the one or more digital documents; (iv) one or more per-word topic designations for at least some of the words in the one or more digital documents; (v) one or more per-word sentiment designations for each of at least some of the words in the one or more digital documents; and (vi) one or more per-word topic-specific sentiment designations for each of the one or more digital documents. As another example, the JST modeling outputs may include at least one of the following: (i) one or more cross-document per-word topic-sentiment correlation indicators for one or more digital documents; (ii) one or more per-document topic correlation indicators for each of the one or more digital documents; (iii) one or more per-document topic-sentiment correlation indicators for each of the one or more digital documents; and (iv) one or more per-sentiment-label topic-word correlation indicators for each of the one or more candidate sentiment labels in the range of one or more candidate sentiment labels associated with the one or more digital documents. As a further example, the JST modeling outputs may include operational recommendations for the organizational predictive entity and/or automatic operational adjustments to the operations of the organizational predictive entity. Examples of such operational JST modeling outputs include critical event identification policies, critical event prioritization policies, net promoter score (NPS) improvement policies, customer targeting policies, growth attainment policies, operational management policies, and/or the like.

FIGS. 10A-10B provide operational examples of two JST modeling output interfaces 1010 and 1060. The JST modeling output interfaces 1010 and 1060 can be used to provide information about topic models of corresponding documents, sentiment models of corresponding documents, and/or relationships between topic models and sentiment models of corresponding documents. As depicted in FIG. 10A, the JST modeling output interface 1010 depicts topic designations for selected words in the input document 1011. For example, the JST modeling output interface 1010 depicts the topic designation "camera" and the sentiment designation (thumps up, 90%) for the selected words "zoom is excellent" in the input document 1011. As another example, the JST modeling output interface 1010 depicts the topic designation "display" and the sentiment designation (thumps down, 50%) for the selected words "LCD is blurry" in the input document 1011. Moreover, the JST modeling output interface 1010 includes per-document topic designations 1021 for the input document 1011 and the per-document sentiment designation 1012 for the input document 1011.

As depicted in FIG. 10B, the JST modeling output interface 1060 depicts topic designations for selected words in the input document 1061. For example, the JST modeling output interface 1060 depicts the topic designation "price" and the sentiment designation (thumps up, 72%) for the selected words "great value . . . price" in the input document 1061. As another example, the JST modeling output interface 1010 depicts the topic designation "overall camera" and the sentiment designation (thumps up, 60%) for the selected words "good camera" in the input document 1061. Moreover, the JST modeling output interface 1060 includes per-document topic designations 1071 for the input document 1061 and the per-document sentiment designation 1062 for the input document 1061.

FIG. 11 provides an operational example of a cross-document per-word topic-sentiment distribution data object

1100 that depicts cross-document per-word topic-sentiment correlation indicators for a range of topic designation and a range of sentiment designations. The cross-document per-word topic-sentiment distribution data object 1100 may be determined based at least in part on pre-configured topic-sentiment correlation data and/or based at least in part on co-occurrences of topic designations and sentiment designations across various documents and/or across various document corpuses. For example, the cross-document per-word topic-sentiment distribution data object 1100 depicts that the topic-sentiment pair (Topic 1, Sentiment +ve) are associated with the cross-document per-word topic-sentiment correlation indicator 0.7. As another example, the cross-document per-word topic-sentiment distribution data object 1100 depicts that the topic-sentiment pair (Topic 3, Sentiment –ve) are associated with the cross-document per-word topic-sentiment correlation indicator 0.8.

FIG. 12 provides an operational example of a digital document 1200, while FIGS. 13-15 provide operational examples of a topic-sentiment correlation graph 1300, a topic word-sentiment correlation graph 1400, and a topic-sentiment correlation graph 1500 for the exemplary digital document 1200 of FIG. 12 respectively. In particular, the topic-sentiment correlation graph 1300 of FIG. 13 depicts sentiment designations for various topic designations associated with the digital document 1200; the topic word-sentiment correlation graph 1400 of FIG. 14 depicts sentiment designations for words in the digital document 1200 that convey a positive sentiment about a news-related topic; and the topic-sentiment correlation graph 1500 of FIG. 15 depicts various sentiment values for a news-related topic determined based at least in part on the digital document 1200.

In some embodiments, performing the ELJST machine learning model comprises performing Gibb's sampling in accordance with the below equation, where $$N_{d_{w_t}}$$

denotes the words of the digital document d that are labeled similar to the word $w_t$, and $$|N_{d_{w_t}}|$$

is the total count of such words:

$$p(z_t = j, l_t = k \mid w_t, z^{-t}, 1^{-t}, \alpha, \beta, \gamma) \propto \frac{N_{j,k,w_t}^{-t} + \beta}{N_{j,k}^{-t} + V\beta} \cdot$$

$$\frac{N_{d,j,k}^{-t} + \gamma_{d,k}}{N_{d,j}^{-t} + \sum_k \gamma_{d,k}} \cdot \frac{N_{d,j}^{-t} + \alpha_j}{N_d^{-t} + \sum_j \alpha_j} \cdot \exp\left(\eta \frac{\sum_{i \in N_{d_{w_t}}} \sum 1_{z_i = j}}{|N_{d_{w_t}}|}\right)$$

Equation 1

In Equation 1, α is a topic-distribution hyper-parameter, β is a topic-sentiment distribution hyper-parameter, γ is a cross-document sentiment distribution hyper-parameter, j is a topical iterative value that during each iteration is assigned to a candidate topic designation corresponding to the iteration, k is a sentiment iterative value that during each iteration is assigned to a candidate sentiment designation corresponding to the iteration, $N_{j,k,p}$ is determined based at least in part on a number of times that the word p is assigned to candidate topic designation j and candidate sentiment designation k, $N_{j,k}$ is determined based at least in part on a number of times that candidate sentiment designation k is assigned to the candidate topic designation j in document d, and $N_{d,j}$ is determined based at least in part on a number of times that the candidate topic designation j is assigned to document d.

Using the model of Equation 1 and samples obtained from a MRF-based semantic graph, the distributions 511-513 can be computed using Equations 2-4:

$$\varphi_{j,k,i} = \frac{N_{j,k,i} + \beta}{N_{j,k} + V\beta}$$

Equation 2

$$\pi_{d,j,k} = \frac{N_{d,j,k} + \gamma_{d,k}}{N_{d,j} + \sum_k \gamma_{d,k}}$$

Equation 3

$$\theta_{d,j} = \frac{N_{d,j} + \alpha_j}{N_d + \sum_j \alpha_j}$$

Equation 4

In some embodiments, performing the operations of the ELJST machine learning model using Gibb's sampling includes performing the operations of the below Procedure 2.

| Procedure 2 |
|---|
| Input      : α, β, γ$^{(d)}$ |
| Initialization: Initialize matrix $\Theta_{D \times T}$, tensor $\Pi_{D \times T \times S}$, tensor $\Phi_{T \times S \times V}$; |
| 1 for i = 1 to max Gibbs sampling iterations do |
| 2      for all documents d ∈ {1, 2, . . . , D} do |
| 3           for all words $w_t$, t ∈ {1, 2, . . . , $N_d$} do |
| 4                Exclude $w_t$ associated with topic j and sentiment label k and compute $N_{j,k,i}$, $N_j$, k $N_{d,j,k}$, $N_{d,j}$, and $N_d$; |
| 5                Sample a new topic-sentiment pair ẑ and k̂ using Eq. [1] |
| 6                Update variables $N_{j,k,i}$, $N_j$, k $N_{d,j,k}$, $N_{d,j}$, and $N_d$ using the new topic label ẑ and sentiment label k̂; |
| 7           end |
| 8      end |
| 9      if number of iterations = max Gibbs sampling iterations then |
| 10           Update Θ, Π and Φ with new sampling results given by Eqs [2] [3] and [4] |
| 11      else |
| 12           True |
| 13      end |
| 14 end |

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a predicted document priority score for a digital document, the computer-implemented method comprising:
    identifying, using one or more processors, a joint sentiment-topic (JST) latent distribution of the digital document, wherein the JST latent distribution describes one or more topic designation probabilities for the digital document and one or more sentiment designation probabilities for the digital document;
    determining, using the one or more processors and by processing the one or more topic designation probabilities using a document-topic entropy determination machine learning model, a document-topic entropy measure for the digital document;
    determining, using the one or more processors and by processing the one or more sentiment designation probabilities using a document-topic entropy determination machine learning model, a sentiment-topic entropy measure for the digital document;
    determining, using the one or more processors and by processing one or more per-word inverse domain frequency measures for the digital document using a document popularity determination machine learning model, a document popularity measure for the digital document;
    generating, using the one or more processors, the predicted document priority score based at least in part on the document-topic entropy measure, the sentiment-topic entropy measure, and the document popularity measure; and
    performing, using the one or more processors, one or more prediction-based actions based at least in part on the predicted document priority score.

2. The computer-implemented method of claim 1, wherein the one or more topic designation probabilities are determined based at least in part on a per-document topic distribution for the digital document.

3. The computer-implemented method of claim 2, wherein the per-document topic distribution comprises a per-document topic correlation indicator for each candidate topic designation of a plurality of candidate topic designations with respect to the digital document.

4. The computer-implemented method of claim 2, wherein:
    the per-document topic distribution is generated based at least in part on a topic-distribution hyper-parameter for an input document corpus,
    the input document corpus comprises one or more digital documents,
    the one or more digital documents comprise the digital document, and
    the per-document topic distribution hyper-parameter indicates a likelihood that each of the one or more digital documents has a threshold correlation with each candidate topic designation of the plurality of candidate topic designations.

5. The computer-implemented method of claim 1, wherein the one or more sentiment designation probabilities are determined based at least in part on a per-document topic-sentiment distribution for the digital document.

6. The computer-implemented method of claim 5, wherein the per-document topic-sentiment distribution comprises a per-document topic-sentiment correlation indicator for each topic-sentiment pair of a candidate topic designation of a plurality of candidate topic designations and a candidate sentiment designation of a plurality of candidate sentiment designations with respect to the digital document.

7. The computer-implemented method of claim 6, wherein:
    the one or more sentiment designation probabilities are determined based at least in part on a subset of each per-document topic-sentiment correlation indicator that relate to one or more selected topics for the digital document, and
    the one or more selected topics are determined based at least in part on the one or more topic designation probabilities.

8. The computer-implemented method of claim 5, wherein:
    the per-document topic-sentiment distribution is generated based at least in part on a per-document sentiment distribution hyper-parameter for the digital document,
    the per-document sentiment distribution hyper-parameter for the digital document is generated based at least in part on a cross-document sentiment distribution hyper-parameter for an input document corpus,
    the input document corpus comprises one or more digital documents,
    the one or more digital documents comprise the digital document, and
    the cross-document sentiment distribution hyper-parameter indicates a likelihood that each of the one or more digital documents in the input document corpus has a threshold correlation with each topic-sentiment pair of a candidate topic designation of the plurality of candidate topic designations and a candidate sentiment designation of a plurality of candidate sentiment designations.

9. The computer-implemented method of claim 1, wherein:
    the digital document is part of an input document corpus,
    the one or more per-word inverse domain frequency measures comprise a per-word inverse-document frequency measure for a word of one or more words of the digital document, and
    each per-word inverse domain frequency measure of the one or more per-word inverse domain frequency measures that is associated with a word of the one or more words describes a per-document frequency of the word within the digital document relative to a per-corpus frequency of the word within the input document corpus.

10. An apparatus for generating a predicted document priority score for a digital document, the apparatus comprising at least one processor and at least one memory including program code, the at least one memory and the program code configured to, with the processor, cause the apparatus to at least:
    identify a joint sentiment-topic (JST) latent distribution of the digital document, wherein the JST latent distribution describes one or more topic designation probabilities for the digital document and one or more sentiment designation probabilities for the digital document;

determine, by processing the one or more topic designation probabilities using a document-topic entropy determination machine learning model, a document-topic entropy measure for the digital document;

determine, by processing the one or more sentiment designation probabilities using a document-topic entropy determination machine learning model, a sentiment-topic entropy measure for the digital document;

determine, by processing one or more per-word inverse domain frequency measures for the digital document using a document popularity determination machine learning model, a document popularity measure for the digital document;

generate the predicted document priority score based at least in part on the document-topic entropy measure, the sentiment-topic entropy measure, and the document popularity measure; and perform one or more prediction-based actions based at least in part on the predicted document priority score.

11. The apparatus of claim 10, wherein the one or more topic designation probabilities are determined based at least in part on a per-document topic distribution for the digital document.

12. The apparatus of claim 11, wherein the per-document topic distribution comprises a per-document topic correlation indicator for each candidate topic designation of a plurality of candidate topic designations with respect to the digital document.

13. The apparatus of claim 11, wherein:
the per-document topic distribution is generated based at least in part on a topic-distribution hyper-parameter for an input document corpus,
the input document corpus comprises one or more digital documents,
the one or more digital documents comprise the digital document, and
the per-document topic distribution hyper-parameter indicates a likelihood that each of the one or more digital documents has a threshold correlation with each candidate topic designation of the plurality of candidate topic designations.

14. The apparatus of claim 10, wherein the one or more sentiment designation probabilities are determined based at least in part on a per-document topic-sentiment distribution for the digital document.

15. The apparatus of claim 14, wherein the per-document topic-sentiment distribution comprises a per-document topic-sentiment correlation indicator for each topic-sentiment pair of a candidate topic designation of a plurality of candidate topic designations and a candidate sentiment designation of a plurality of candidate sentiment designations with respect to the digital document.

16. The apparatus of claim 15, wherein:
the one or more sentiment designation probabilities are determined based at least in part on a subset of each per-document topic-sentiment correlation indicator that relate to one or more selected topics for the digital document, and
the one or more selected topics are determined based at least in part on the one or more topic designation probabilities.

17. The apparatus of claim 14, wherein:
the per-document topic-sentiment distribution is generated based at least in part on a per-document sentiment distribution hyper-parameter for the digital document,
the per-document sentiment distribution hyper-parameter for the digital document is generated based at least in part on a cross-document sentiment distribution hyper-parameter for an input document corpus,
the input document corpus comprises one or more digital documents,
the one or more digital documents comprise the digital document, and
the cross-document sentiment distribution hyper-parameter indicates a likelihood that each of the one or more digital documents in the input document corpus has a threshold correlation with each topic-sentiment pair of a candidate topic designation of the plurality of candidate topic designations and a candidate sentiment designation of a plurality of candidate sentiment designations.

18. The apparatus of claim 10, wherein:
the digital document is part of an input document corpus,
the one or more per-word inverse domain frequency measures comprise a per-word inverse-document frequency measure for a word of one or more words of the digital document, and
each per-word inverse domain frequency measure of the one or more per-word inverse domain frequency measures that is associated with a word of the one or more words describes a per-document frequency of the word within the digital document relative to a per-corpus frequency of the word within the input document corpus.

19. A computer program product for generating a predicted priority score for a digital document, the computer program product comprising at least one non-transitory computer-readable storage medium having computer-readable program code portions stored therein, the computer-readable program code portions configured to:
identify a joint sentiment-topic (JST) latent distribution of the digital document, wherein the JST latent distribution describes one or more topic designation probabilities for the digital document and one or more sentiment designation probabilities for the digital document;
determine, by processing the one or more topic designation probabilities using a document-topic entropy determination machine learning model, a document-topic entropy measure for the digital document;
determine, by processing the one or more sentiment designation probabilities using a document-topic entropy determination machine learning model, a sentiment-topic entropy measure for the digital document;
determine, by processing one or more per-word inverse domain frequency measures for the digital document using a document popularity determination machine learning model, a document popularity measure for the digital document;
generate the predicted document priority score based at least in part on the document-topic entropy measure, the sentiment-topic entropy measure, and the document popularity measure; and
perform one or more prediction-based actions based at least in part on the predicted document priority score.

20. The computer program product of claim 19, wherein the one or more topic designation probabilities are determined based at least in part on a per-document topic distribution for the digital document.

* * * * *